(12) United States Patent
Hannington et al.

(10) Patent No.: US 8,821,992 B2
(45) Date of Patent: Sep. 2, 2014

(54) OLIGOSILOXANE MODIFIED LIQUID CRYSTAL FORMULATIONS AND DEVICES USING SAME

(75) Inventors: Jonathan Paul Hannington, Midland, MI (US); Terry Victor Clapp, Bishop's Stortford (GB); Fumito Nishida, Midland, MI (US); Russel Keith King, Midland, MI (US); Omar Farooq, Saginaw, MI (US); Martin Grasmann, Midland, MI (US); William Alden Crossland, Harlow (GB); Harry James Coles, Sutton Ely (GB); Anthony Bernard Davey, Cambridge (GB); Huan Xu, Cambridge (GB); Oliver Hadeler, Cambridge (GB); Mykhaylo Pivnenko, Cambridge (GB)

(73) Assignees: Dow Corning Corporation, Midland, MI (US); Cambridge Enterprise Ltd., Cambridge (GB)

( * ) Notice: Subject to any disclaimer, the term of this patent is extended or adjusted under 35 U.S.C. 154(b) by 973 days.

(21) Appl. No.: 12/739,445

(22) PCT Filed: Oct. 26, 2007

(86) PCT No.: PCT/US2007/082676
§ 371 (c)(1),
(2), (4) Date: Apr. 23, 2010

(87) PCT Pub. No.: WO2009/054855
PCT Pub. Date: Apr. 30, 2009

(65) Prior Publication Data
US 2010/0283925 A1    Nov. 11, 2010

(51) Int. Cl.
C09K 19/40    (2006.01)
C09K 19/34    (2006.01)
C09K 19/12    (2006.01)
C09K 19/20    (2006.01)
C09K 19/54    (2006.01)
G02F 1/141    (2006.01)

(52) U.S. Cl.
CPC .................................. C09K 19/406 (2013.01)
USPC ................... 428/1.1; 252/299.01; 252/299.5; 252/299.61; 252/299.64; 252/299.66; 252/299.67; 349/172

(58) Field of Classification Search
CPC ... C09K 19/0225; C09K 19/406; G02F 1/141
USPC ............. 252/299.01, 299.61, 299.64, 299.66, 252/299.67, 299.5; 428/1.1; 349/171, 172
See application file for complete search history.

(56) References Cited

U.S. PATENT DOCUMENTS

| | | | |
|---|---|---|---|
| 4,367,924 A | 1/1983 | Clark et al. | |
| 4,563,059 A | 1/1986 | Clark et al. | |
| 5,498,368 A | 3/1996 | Coles | |
| 5,720,898 A | 2/1998 | Nohira et al. | |
| 5,748,164 A | 5/1998 | Handschy et al. | |
| 5,972,241 A | 10/1999 | Johnson et al. | |
| 6,051,639 A | 4/2000 | Mehl et al. | |
| 6,277,451 B1 | 8/2001 | Mehl et al. | |
| 6,507,330 B1 | 1/2003 | Handschy et al. | |
| 6,737,124 B2 | 5/2004 | Gough et al. | |
| 6,783,812 B2 | 8/2004 | Wand et al. | |
| 6,838,128 B1 | 1/2005 | Wand et al. | |
| 7,351,452 B2 | 4/2008 | Goodby et al. | |
| 8,025,937 B2 * | 9/2011 | Clapp et al. | 428/1.1 |
| 8,368,831 B2 * | 2/2013 | Hannington et al. | 349/41 |
| 2002/0130299 A1 | 9/2002 | Wand et al. | |
| 2003/0003245 A1 | 1/2003 | Gough et al. | |
| 2004/0206933 A1 | 10/2004 | Goodby et al. | |

FOREIGN PATENT DOCUMENTS

| | | |
|---|---|---|
| EP | 0032362 A1 | 7/1981 |
| EP | 0778960 B1 | 10/2001 |
| GB | 2274652 A | 8/1994 |
| GB | 2317186 A | 3/1998 |
| WO | 9736908 A1 | 10/1997 |
| WO | 9736947 A1 | 10/1997 |
| WO | 9932576 A2 | 7/1999 |
| WO | 03024903 A1 | 3/2003 |
| WO | 03040074 A1 | 5/2003 |
| WO | 03040812 A1 | 5/2003 |
| WO | 2009054855 A1 | 4/2009 |

OTHER PUBLICATIONS

U.S. Office Action pertaining to U.S. Appl. No. 12/296,612, dated Mar. 23, 2011.
U.S. Office Action pertaining to U.S. Appl. No. 12/296,612 dated Oct. 12, 2010.
Sunohara, et al., "A Novel Class of Materials for Ferroelectric Liquid Crystals Containing Siloxy Chain End Groups", Feb. 13, 1993, pp. 283-294; Liquid Crystals, vol. 13, No. 2; Taylor & Francis Ltd.
Newton, et al., "A New Series of Low Molar Mass Ferroelectric Organosiloxanes With Unusual Electro-Optic Properties", 1993, pp. 379-387; Ferroelectrics, vol. 148; Gordon and Breach Science Publishers S.A., USA.

(Continued)

Primary Examiner — Shean C Wu
(74) Attorney, Agent, or Firm — Brinks Gilson & Lione

(57) ABSTRACT

A liquid crystal formulation is described. The liquid crystal formulation comprises a first oligosiloxane-modified nano-phase segregating liquid crystalline material; and at least one additional material selected from a second oligosiloxane-modified nano-phase segregating liquid crystalline material, non-liquid crystalline oligosiloxane-modified materials, organic liquid crystalline materials, or non-liquid crystalline materials, wherein the liquid crystal formulation has an I→SmA*→SmC* phase transition, with a SmC* temperature range from about 15° C. to about 35° C., a tilt angle of about 22.5°±6° or about 45°±6°, a spontaneous polarization of less than about 50 nC/cm2., and a rotational viscosity of less than about 600 cP. Devices containing liquid crystal formulations are also described. The device has a stable bookshelf geometry, bistable switching, and isothermal electric field alignment, a response time of less than 500 µs when switched between two stable states, and an electric drive field of less than about 30 V/µm.

19 Claims, 4 Drawing Sheets

(56) References Cited

OTHER PUBLICATIONS

Goodby, et al., "Chiral Liquid Crystals for Ferroelectric, Electroclinic and Antiferroelectric Displays and Photonic Devices", 2000, pp. 2-14; Liquid Crystal Materials, Devices, and Flat Panel Displays, Proceedings of SPIE vol. 3955.

Walba, et al., "Chiral SmA* Materials for Display Applications?", 2007, pp. 585-588; Journal of the SID, USA.

Owen, et al., "Comparison of Mesomorphic Behaviour and Electro-Optic Properties of Ferroelectric Mesogens With and Without Disiloxane End-Groups", 1995, pp. 563-575; Mol. Cryst. Liq. Cryst., vol. 265; Overseas Publishers Association, Malaysia.

Manolis, et al., "Control of the Electro-Optic Bistability of Some Ferroelectric Liquid Crystals Useful for Binary Phase Optical Modulators", 2000, pp. 305-314; Mol. Cryst. And Liq. Cryst., vol. 351; Overseas Publishers Association, Malaysia.

Lagerwall, et al., "Current Topics in Smectic Liquid Crystal Research", 2006, pp. 20-45; www.Chemphyschem.org.

Crossland, et al., "Electro-Optical Bistability in Ferroelectric Liquid Crystal Switching Devices for Use in Displays and Real-Time Holography", 2004, pp. 3-23; Ferroelectrics, vol. 312, Taylor & Francis, UK.

Hadeler, et al., "Fast Electro-Optic Liquid Crystal Switch and Attenuator With Large Extinction Ratio at 1550 nm", pp. 1-6, Proc. SPIE 5741, 2005.

Robinson, et al., "Ferroelectric and Antiferroelectric Low Molar Mass Organosiloxane Liquid Crystals", 1998, pp. 301-307; Liquid Crystals, vol. 25, No. 3; Taylor & Francis Ltd.

Redmond, et al., "Ferroelectric and Electroclinic Characterisation of a New Organic Siloxane Bimesogen", 1993, pp. 323-336; Ferroelectrics, vol. 148; Gordon and Breach Science Publishers S.A., USA.

Wilkinson, et al., "Liquid Crystal Materials and Applications for the Next Generation of Microdisplays", 2003, pp. 57/[171[-65/[179]; Mol Cryst. Liq. Cryst., vol. 401; Taylor & Francis, Inc., UK.

Pivnenko, et al., "Optical and Electro-Optical Properties of Bimesogenic Organosiloxane Antiferroelectric Liquid Crystals With Molecular Tilt Approaching 45 Degrees", Feb. 2005, pp. 173-181; Liquid Crystals, vol. 32, No. 2, Taylor & Francis, http://www.tandf.co.uk/journals, UK.

De Hondt, et al., "Perylene-Baseed Fluorescent Liquid Crystal Dye guest-Host Mixtures", 2001, pp. 263-270; Mol. Cryst and Liq. Cryst., vol. 366; Overseas Publishers Association, USA.

Naciri, et al., "Novel Ferroelectric and Electroclinic Organosiloxane Liquid Crystals", 1995, pp. 1397-1402; Chem. Mater., vol. 7; American Chemical Society.

Pivnenko, et al., "Novel Electroclinic Organosiloxane Materials for Optoelectronic Devices", pp. 1-12; Proceedings of SPIE 5289, SPIE/IS, Bellingham WA, USA, 2004.

Shilov, et al., "Segmental Orientation and Mobility of Ferroelectric Liquid Crystal Polymers", 1997, pp. 203-210; Liquid Crystals, vol. 22, No. 2; Taylor & Francis Ltd.

Poths, et al., "Dimesogenic Ferroelectric Polysiloxanes", May 1994, pp. 433-440; Macromolecular Rapid Communications 15, No. 5; Huthig & Wepf Verlag, Basel, Germany.

International Search Report and Written Opinion, Apr. 21, 2008 for International Application No. PCT/US2007/082676, pp. 1-21.

* cited by examiner

OLIGOSILOXANE MODIFIED LIQUID CRYSTAL FORMULATIONS AND DEVICES USING SAME

This application relates to the use of oligosiloxane modified liquid crystals and their use in electro-optic devices. The invention specifically relates to the formulation of such liquid crystals to enable their use in bistable, ferroelectric displays which can be isothermally electric field aligned, and which also have very low spontaneous polarizations (Ps) which are required for practical devices utilizing active matrix backplane technologies.

Thermotropic liquid crystals are materials which are capable of exhibiting liquid crystal, or mesogenic phases, where the phase can change as a function of temperature. The liquid crystalline phases, such as nematic or smectic, tend to exist between the isotropic and crystalline phases and exhibit physical properties which are not observed for isotropic (liquid) or crystalline phases. For example, a liquid crystal phase can exhibit both birefringent and fluid behaviors at the same temperature. Such properties have been exploited in electro-optic devices such as transmissive and reflective displays, where the birefringence can be effectively tuned by the application of electric fields in a device structure where the orientation of the liquid crystal molecules has been controlled. Nematic liquid crystals have been widely exploited in liquid crystal displays (LCD's), for example in displays for laptop computers, cell phones, PDAs, computer monitors and TVs. While electro-optic devices based upon nematic liquid crystals have been widely utilized, the fastest response time of such devices is restricted to on the order of a millisecond because such devices rely on a surface alignment controlled relaxation process for part of the switching cycle. Ferroelectric liquid crystals have the potential to switch between optical states much more rapidly. However, although both digital and analogue mode devices have been developed, such devices have proven to be difficult to deploy and therefore have only been commercialized in specialized microdisplay applications such as camera viewfinders.

Clark and Lagerwall (U.S. Pat. No. 4,367,924, and Applied Physics Letters, 36, 899-901, (1980) both of which are incorporated by reference herein) have described devices which utilize organic ferroelectric liquid crystals which exhibit sub-microsecond electro-optic switching speeds. The Clark and Lagerwall devices are so-called Surface Stabilized Ferroelectric Liquid Crystal Devices (SSFLCDs). Such devices utilize organic ferroelectric liquid crystals, or their formulations, which exhibit the chiral smectic C (SmC*) phase that is required for the ferroelectric switching SSFLCD mode. The materials typically exhibit the following phase sequence upon cooling in order to facilitate the manufacture of SSFLCDs: Isotropic→Nematic→SmA*→SmC*, where SmA* is the chiral smectic A phase and SmC* is the chiral smectic C phase. This phase sequence permits the formation of surface stabilized aligned phases due to the surface registration of the liquid crystalline molecules in the higher temperature low viscosity nematic phase. The aligned liquid crystal device is then carefully cooled into the SmC* phase to create the SSFLCD. If the SmC* phase can be robustly aligned into the so-called "bookshelf" geometry, then the devices exhibit bistable ferroelectric switching.

However, this has proved to be difficult in practice. SSFLCDs are susceptible to several problems which have resulted in only limited commercialization of the technology. A key limitation results from the phase sequence employed, because conventional organic FLCs undergo a significant layer shrinkage during the transition when cooled from the higher temperature SmA* into the lower temperature SmC* phase.

The shrinkage of the layered structures results in the formation of defects (zig-zag defects, due to the formation of buckled layers, or chevrons) which significantly reduce the contrast ratios observed for SSFLCDs. The formation of chevron structures and the control of these structures enable the fabrication of either C1 or C2 type structure, as is well known to those skilled in the art, for example, see *Optical Applications of Liquid Crystals*, ed. L Vicari, Chapter 1, ISBN 0750308575. In some cases, the ideal so-called "bookshelf geometry" where the layers of the SmC* phase are arranged perpendicular to the device substrates and alignment layers, can be induced by the application of an electric field. However, devices with induced, or pseudo, bookshelf structures are not practical for commercial display devices due to manufacturing requirements and the potential for the devices to revert to the chevron alignment once deployed. Thus, while many SSFLCD patents claim that bookshelf structures are present, it is important to understand whether such structures are true bookshelf structures, or pseudo bookshelf structures, and whether chevron structures are present when utilized for devices. These limitations of conventional SSFLCDs are also discussed by Crossland et al. in Ferroelectrics, 312, 3-23 (2004).

This inherent problem for FLC materials with the Isotropic→Nematic→SmA*→SmC* phase sequence has led to the investigation of new materials which are not prone to the layer shrinkage phenomenon. One approach to eliminate this problem is to use so called "de Vries" type materials which exhibit an Isotropic→SmA*→SmC* phase sequence and where there is practically no layer shrinkage at the SmA*→SmC* phase transition. The absence of a very low viscosity nematic phase requires alternative alignment schemes to allow the random domains and natural helielectric state of the SmC* phase to be converted into a phase structure approaching a mono-domain, which is orientated with respect to the electrodes and substrates to yield a practical electro-optic device.

Oligosiloxane modified liquid crystals are differentiated from conventional liquid crystals due to their propensity to form nano-phase segregated layered structures, as described by Coles et al. (Liquid Crystals, 23(2), 235-239, (1997); J. Phys. II France, 6, 271-279, (1996); Li et al. (J. Mater. Chem. 17, 2313-2318, (2007); and references cited therein). Such systems have been described as "virtual polymers" because their structures and properties combine some of the features of Side Chain Liquid Crystal Polymers (SCLCP) and some of the properties of conventional organic liquid crystals. The structure and properties of oligosiloxane modified liquid crystals differ so significantly from organic liquid crystals that they have been classified as a type of amphiphilic, or nano-phase segregated, liquid crystal in a scientific review article. (see C. Tschierske, "Non-conventional liquid crystals—the importance of micro-segregation for self-organization" in J. Mater. Chem., 1998, 8(7), 1485-1508). The structures of such systems are still an area of active scientific debate; see Li et al. (J. Mater. Chem., 17, 2313-2318, (2007)).

Coles (U.S. Pat. No. 5,498,368 and Proceedings of SPIE, 2408, 22-29 (1995) both of which are incorporated herein by reference) highlighted the unexpected properties of single component oligosiloxane-modified ferroelectric liquid crystals based upon phenylbenzoate aromatic cores. True bistability, i.e., the retention of the electrically selected orientation of the LC mono-domain after the removal of an applied electric field, and the greatly reduced sensitivity of the FLC tilt angle over a temperature range as wide as a 50° C., were demonstrated in this patent. In this case, a mono-domain was created by slowly cooling the device (e.g., 1° C./min) from the isotropic phase and then through the SmC* phase in the presence of an applied electric field. Crossland et al. (WO 2005019380A1) later demonstrated devices comprising single component oligosiloxane FLCs based upon similar phenyl benzoate aromatic cores which utilized only electric fields for mono-domain alignment (i.e., enabling isothermal alignment) and which were bistable based upon the definition included in the patent application.

Walba et al. (U.S. Pat. No. 6,870,163, which is incorporated herein by reference) noted that it is well known to those skilled in the art of FLC materials and devices that a typical FLC device does not exhibit true optical bistability due to chevron defect formation. Crossland et al., in Ferroelectrics, 312, 3-23 (2004), discussed the impact of this limitation on device operation, for example, the need for DC balancing and inverse framing leading to "dead periods" during imaging. U.S. Pat. No. 6,507,330 (Handschy et al.) also discussed the need for DC balancing.

Goodby et al. (U.S. Publication 2005/0001200A1, incorporated herein by reference) described a composition of matter for a class of oligosiloxane liquid crystals containing a biphenyl core. Goodby noted that such materials can be used alone or in an admixture with other liquid crystals, although he did not discuss the design of such mixtures, beyond the use of claimed materials having a SmA phase to stabilize the SmA phase of the resulting liquid crystal mixture. Based on this and the comparative compound examples in the patent, it is apparent that the intent is to design conventional SSFLC mixtures with the Isotropic→Nematic→SmA*→SmC* phase sequence. The patent discusses only the phase sequences of the materials claimed, with no mention of other critical physical properties which are needed to construct a practical FLCD.

Those skilled in the FLC art know that molecules are usually formulated to provide mixtures with broad operating ranges and to tune the many physical properties which must be optimized to meet the requirements of a practical FLC device. The vast majority of this formulation knowledge has been developed using organic FLCs which have been developed for use in the conventional mode, chevron devices which also utilize materials with the Isotropic→Nematic→SmA*→SmC* phase sequence.

The formulation of oligosiloxane-modified nano-phase segregated ferroelectric liquid crystals for use in practical devices, for example, including but not restricted to, active matrix Ferroelectric LCDs (FLCDs), has not been reported in detail. In contrast, the formulation of organic liquid crystals has been extensively studied, and many predictive rules (Demus et al., Mol. Cryst. Liq. Cryst., 25, 215-232, (1974); Hsu et al., Mol. Cryst. Liq. Cryst., 27, 95-104, (1974); and Rabinovich et al., Ferroelectrics, 121, 335-342, (1991)) have been developed to aid the design of the liquid crystal phase behavior of such formulations. In our experience, such formulation design approaches are not suitable for oligosiloxane-modified FLCs, where even standard "rules of thumb" that the phase of an unknown liquid crystal can be identified if it is miscible with a liquid crystal with a known phase (Goodby & Gray, in *Physical Properties of Liquid Crystals*, ISBN 3-527-29747-2, page 17), i.e., "like liquid crystals" are miscible with "like liquid crystals", break down. Such basic rules do not apply to oligosiloxane modified ferroelectric liquid crystals where the nano-phase segregated smectic layering dominates, and other classes of liquid crystal, or even non-liquid crystal molecules, are readily admixed without the loss of the SmC* phase structure. For example, Coles and Li have independently demonstrated unexpected examples of miscibility in such systems, highlighting the difference of oligosiloxane systems from organic LC systems (see Coles et al., Ferroelectrics, 243, 75-85, (2000) and Li et al., Advanced Materials 17(5), 567-571, (2005), both of which are incorporated herein by reference). Prior to the present invention, well-defined predictive rules for the formulation of compositions containing high levels of oligosiloxane liquid crystals have not been identified, nor has the ability to tune physical property sets to meet practical device materials, alignment and robustness requirements been demonstrated. For example, the attempt of Li et al. (J. Mater. Chem., 17, 2313-2318, (2007)) to study the tilt angle of a simple series of materials was frustrated because only an minority of the mixtures prepared could be aligned to allow the tilt angle to be determined.

Canon (U.S. Pat. No. 5,720,898, which is incorporated herein by reference) describes a class of device containing a main chain type liquid crystal containing a siloxane linking group and a liquid crystalline monomer. In U.S. Pat. No. 5,720,898, the smallest main chain polymer can be an ABA species, where A=a mesogenic group and B=a disiloxane linkage. This patent teaches that the smectic ABA material is added as a minor component to a monomeric, organic mesogen, and there is no suggestion that the liquid crystal phase is nano-phase segregated. In fact, the siloxane additive does not perturb the conventional smectic phase structure. The inventors noted that the phase can be stabilized provided the covalently bonded ABA oligomer is able to span adjacent layers of the smectic phase. The liquid crystal system is macroscopically aligned by stretching or shearing of the LC medium within the device. In this example, the layer structure is not nano-phase segregated because it is based on monomeric, organic mesogens, and the ABA oligosiloxane is added at low concentration to span the existing layers, thus, pinning them together and stabilizing the phase. The patent teaches that if the siloxane linking segment is too large, the molecule may fold into a hairpin and no longer span the adjacent layers, and thus the pinning mechanism is lost.

Li et al. (J. Mater. Chem., 17, 2313-2318, (2007), incorporated herein by reference) prepared some achiral siloxane terminated phenylpyrimidines. Some of these materials had an Isotropic→SmC→Crystal phase sequence (mesogens 1a, 1b, 1c, 1d, 1e, 2e, 5, 6, 7, 8), while others had an Isotropic→SmA→SmC→Crystal phase sequence (mesogens 2a, 2b, 2c, 2d, 3, 4). He used 1 mole % of a chiral oligosiloxane ("Br11-Si$_3$") as an additive to mesogens 1b, 2b, 3, 4, 5, 6, 7, and 8 in an attempt to measure the optical tilt angle by POM (Polarized Optical Microscopy). He noted that others had observed discrepancies between the X-ray data and POM observations for siloxane-terminated liquid crystals and investigated the relationship between the smectic layer spacing defined by X-ray and the optical tilt angle of selected mesogens. The phase sequences of the binary mixtures formed are not reported. He reported that five mixtures (based upon 1b, 5, 6, 7, and 8, all of which have an Isotropic→SmC phase sequence) were prepared but could not be aligned into a mono-domain, and that he could not measure a tilt angle. He noted the alignment materials and the cell gap used but did not discuss the process used to attempt to create alignment within the test cell. He noted that he was able to align one sample, based on mesogen 2b, and a tilt angle of 36 degrees was measured. This tilt angle is not useful for a practical FLCD, where tilt angles close to 22.5 degrees or 45 degrees are a prerequisite depending on the operational mode of the FLC device and hence, it is clear that the objective of formulation is not for property optimization but merely to enable measurement. He noted that samples must be aligned to measure the tilt angle and reported tilt angles for two further mixtures based upon mesogens 3 and 4 (24 and 26 degrees, respectively). Thus, he reported that he could only align mixtures where the chiral additive was added to a mesogen with an Isotropic→SmA→SmC→Crystal phase sequence. The abstract and summary highlight the bone fide de Vries behavior of mesogen 3, which has a terminal chlorine atom and an Isotropic→SmA→SmC phase sequence. The structures are shown below.

could be detected via a distinct difference in the interference color of the liquid crystal, as observed using polarized light optical microscopy. Walba et al. ("Chiral SmA* Materials for Display Applications", 26th International Display Research Conference, Sept. 18-21, 2006, Kent, Ohio) noted that there is no real consensus regarding a clear set of defining characteristics of the de Vries phase and list multiple characteristics. They noted that a specific material could exhibit a selection of characteristics from the list given. They also discussed fluoroether mesogens and noted that these materials exhibited another kind of de Vries phase. Thus, the term de Vries is

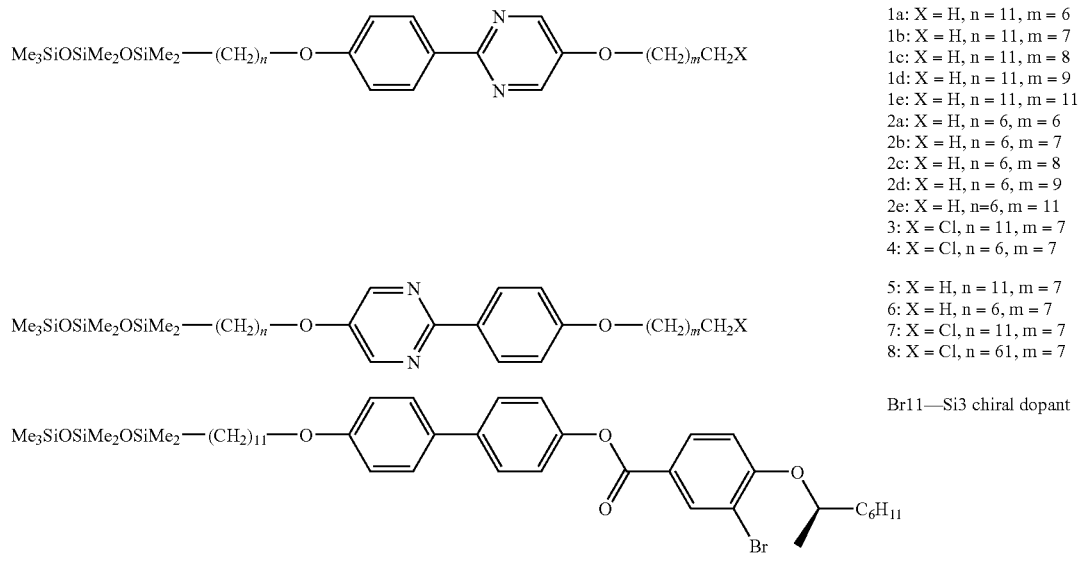

Li noted that chloro-terminated host mesogens provide an optimum route to the preparation of "so-called" de Vries materials. Li noted that hosts with terminal-chloro groups have the potential to exhibit interesting ferroelectric properties upon doping, but does not demonstrate this. In a later conference presentation (Ferroelectric Liquid Crystal Conference 2007, Sapporo), Lemieux demonstrated the ability to tune the Ps in similar systems, but did not discuss the tilt angles, alignment, bistability or rotational viscosity of such systems. Thus, suitability for a practical FLCD was not demonstrated. Li et al. (J. Mater. Chem., 17, 2313-2318, (2007)) noted that the materials studied exhibited de Vries behavior because they exhibit minimal layer shrinkage upon cooling through the SmA to SmC phase transition as well as a significant increase in birefringence, as deduced from significant changes in the interference colors in the fan/broken fan textures of both compounds 3 and 4 upon cooling from the SmA phase to the SmC phase.

Those skilled in the art will understand that the definition of "de Vries" like behavior can vary from materials system to materials system. Close examination of the scientific literature reveals that there are many different criteria which have been used to define this type of behavior and that there is no "universal" set of criteria which can describe all systems. In a review on "Current Topics in Smectic Liquid Crystal Research", Giesselmann et al. (Chem. Phys., 7, 20-45, (2006)) presented a modern view of de Vries behavior, noting that de Vries materials are characterized by a layer shrinkage at the SmA to SmC phase transition of <1% and an increase in optical birefringence of 10-20% at the SmA to SmC phase transition. He also noted that the change in birefringence currently used to define SmA to SmC transitions which are not regular, but which may exhibit a wide range of combinations of properties in addition to minimal layer shrinkage.

Walba et al. (U.S. Pat. No. 6,870,163B1) noted that "the presence of a de Vries Smectic A phase is an identifying characteristic of an FLC compound or material that will form the bookshelf geometry in an SSFLC device and exhibit true bistable switching".

Therefore, there is a need for formulations of oligosiloxane liquid crystal materials which can be used in bistable, ferroelectric displays.

The present invention meets that need by providing a nano-phase segregated oligosiloxane modified liquid crystal formulation with a balanced property set for application in practical devices. The liquid crystal formulation comprises a first oligosiloxane-modified nano-phase segregating liquid crystalline material; and at least one additional material selected from a second oligosiloxane-modified nano-phase segregating liquid crystalline material, non-liquid crystalline oligosiloxane-modified materials, organic liquid crystalline materials, or non-liquid crystalline materials, wherein the liquid crystal formulation has an I→SmA*→SmC* phase transition, with a SmC* temperature range from about 15° C. to about 35° C., a tilt angle of about 22.5°±6° or about 45°±6°, a spontaneous polarization of less than about 50 nC/cm$^2$, and a rotational viscosity of less than about 600 cP.

Another aspect of the invention is a device containing the liquid crystal formulation described above. The device has a stable bookshelf geometry, bistable switching, and isothermal electric field alignment, a response time of less than 500

μs when switched between two stable states, and an electric drive field of less than about 30 V/μm.

Figure 1:
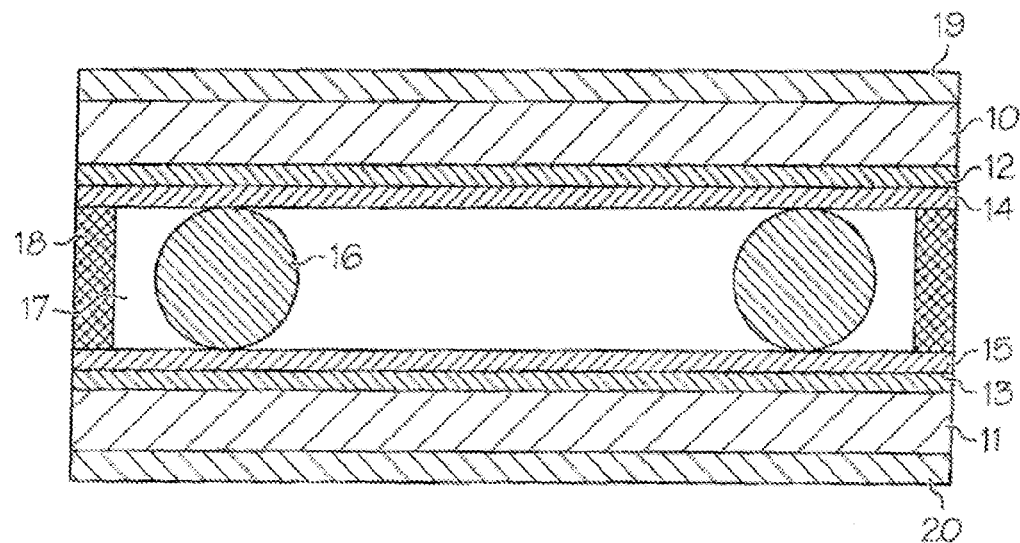
FIG. 1 shows a cross-section of a typical bistable liquid crystal cell.

Prior to the present invention, well-defined predictive rules for the formulation of compositions containing high levels of oligosiloxane liquid crystals demonstrating the ability to tune physical property sets to meet practical device materials have not been demonstrated. The present invention demonstrates the benefit of the use of oligosiloxane-modified liquid crystals components for the formulation of ferroelectric liquid crystal compositions exhibiting an Isotropic→SmA*→SmC* phase sequence, yielding a balanced property set that can be utilized to realizing the practical devices based on Si-TFT technology.

The oligosiloxane-modified liquid crystals which are the subject of this patent are an example of a subclass of nano-phase segregated liquid crystals. We have determined that the behaviors of oligosiloxane-modified liquid crystal formulations are fundamentally different from the majority of conventional liquid crystals due to the nano-phase segregation with distinct features stemming from the presence of a discrete siloxane rich region. For example, the type of oligosiloxane-modification employed has been found to promote smectic phase formation, presumably due to nano-phase segregation. Furthermore, because of the impact of nano-segregated smectic layering, other classes of liquid crystals and non-liquid crystal molecules are readily admixed without the loss of the smectic phase structure. These are important features because of the challenge in achieving the necessary property sets in a single molecule. Therefore, property optimization by mixing of various components is an important approach in realizing practical liquid crystal materials. The stabilized smectic phase found in a distinct class of liquid crystals represented by the nano-phase segregating oligosiloxane-modified liquid crystals is an important feature in the present invention where strategic formulation is employed to realize a practical composition with a well balanced property set, while retaining the SmC* phase and bookshelf structure necessary for a ferroelectric liquid crystal, for use in practical FLC devices.

Dow Corning, Crossland, and Coles have demonstrated that a nano-phase segregated oligosiloxane with a liquid an Isotropic→SmC* phase sequence can also exhibit bookshelf structures and true bistable switching. Thus, this property set is not unique to "de Vries" materials. We have demonstrated that Isotropic→SmC* phase sequence materials can be formulated to produce an Isotropic→SmA*→SmC* phase sequence, and that these materials, which are the subject of this invention, can also exhibit bookshelf structures and true bistable switching. Thus, although not wishing to be bound by theory, we believe that in the case of oligosiloxane-modified liquid crystals, the nano-phase segregation is the major contributor responsible for the stable bookshelf formation and bistable switching. We have shown that the formation of a discrete SmA* phase is not essential in the case of oligosiloxane-modified liquid crystals. We have also demonstrated that some oligosiloxane-modified liquid crystals exhibit other properties which are different from the "De Vries transition" described by Giesselman et al. (Chem. Phys., 7, 20-45, (2006)), for example, i) some oligosiloxane-modified liquid crystals with an Isotropic→SmA*→SmC* phase sequence do not exhibit the characteristic "distinct" change in birefringence at the SmA*→SmC* phase transition, even when an electric field is applied and ii) oligosiloxane-modified liquid crystal formulations with such property sets do not need to be based upon one or more components which exhibit a form of de Vries behavior, i.e., the Isotropic→SmA*→SmC* phase sequence, and favorable property sets can be induced via appropriate formulation.

The present invention will demonstrate how to successfully develop the basic materials and device properties required for practical devices within nano-phase segregated, oligosiloxane FLC systems. Formulations having an Isotropic→SmA*→SmC* phase sequence and the novel ferroelectric devices that they enable are the subject of the present invention. Although wholly organic mesogens may be formulated with this phase sequence, the present invention relates to formulations which contain at least one oligosiloxane-modified liquid crystal. These low molecular mass liquid crystals are hybrid siloxane-organic moieties, where a discrete siloxane segment is grafted onto an organic moiety, or moieties, in an AB or ABA fashion, where B=oligosiloxane and A=organic. The siloxane is oligomeric and is thus differentiated from Side-Chain Liquid Crystal Polysiloxanes (SCLCP), Main-Chain Liquid Crystal Polysiloxanes (MCLCP), or Liquid Crystal polysiloxane Elastomers (LCE) in both structure and physical properties. Oligosiloxane LCs are of interest because they combine stable smectic phases with the high degree of mobility required for the operation of practical LCDs.

The present invention relates to the design of optimized ferroelectric liquid crystal formulations which contain at least one oligosiloxane-modified liquid crystalline material. The oligosiloxane-modified liquid crystalline material may be blended with other oligosiloxane-modified liquid crystals, organic liquid crystals, non-liquid crystalline hybrid oligosiloxane organic materials, or non-liquid crystalline organic materials to create formulations with optimized liquid crystalline properties. The formulations may be used to prepare FLC devices which are isothermally electric field aligned in the SmC* phase and exhibit true bistability. These features enable digital addressing schemes without the need to use inverse frames for the purposes of DC-balancing, coupled with the ability to align or re-align the device isothermally using only electric fields. The latter property overcomes the short-comings of wholly organic Isotropic→Nematic→SmA*→SmC* phase sequence materials, where the requirement for slow cooling makes it difficult to re-align a device that has damaged alignment caused by mechanical shock or temperature excursions once it has been deployed. Optionally, the formulations which are the subject of this application may exhibit phases directly below the SmC* phase (i.e., at lower temperature) where the electric field aligned texture is retained and truly bistable switching is observed upon heating back into the SmC* without any significant impact on the operation of the device, for example, a reduction of the contrast ratio of the device. The properties of devices fabricated using the claimed formulations and device fabrication methods result from the unique nano-phase segregated structures of the oligosiloxane-modified liquid crystals and the ability to retain this structure in formulations. The oligosiloxane-modified liquid crystalline component(s) should always be present in sufficient concentration to induce a nano-phase segregated SmC* phase, for example, as detected by X-Ray Diffraction studies.

The formulation includes at least two components. There can one or more oligosiloxane-modified liquid crystalline materials in the formulation. In addition, there can be one or more non-liquid crystalline oligosiloxane-modified materials, organic liquid crystalline materials, or organic non-liquid crystalline materials in the formulation. In general, any single oligosiloxane-modified liquid crystalline material is present in an amount less than about 95 mol %. However, the total amount of two or more oligosiloxane-modified liquid crystalline materials can be more than 95 mol %. The components which are not oligosiloxane-modified liquid crystalline materials (if any) are generally present in an amount of less than about 50 mol %, or less than about 45 mol %, or less than about 40 mol %, or less than about 35 mol %, or less than about 30 mol %. Anti-ferroelectric oligosiloxane-modified materials, although not preferred, can be used in quantities which do not detract from the property set.

These formulations are designed for use in a range of devices which utilize amplitude or phase modulation of light including, but not limited to, transmissive displays, spatial light modulators, and reflective mode microdisplays. Such devices may utilize passive matrix style addressing or active pixel addressing with thin film transistors (TFT) backplanes, for example, devices such as Passive Matrix Liquid Crystal Devices (PMLCD), or Active Matrix Liquid Crystal Devices (AMLCD). In this application, we will focus upon the case of AMLCD devices, which can operate in transmissive or reflective modes. However, the formulations are not intended to be limited to use with such a device; they could be used with other devices, which are well known to those of skill in the art. The use of TFTs to control liquid crystal orientation, whether based upon amorphous silicon (a-Si), Low Temperature Polycrystalline Silicon (LTPS), or crystalline Silicon, imposes constraints on the magnitude of the spontaneous polarization (Ps) of the liquid crystal formulation which can be tolerated due to charge transport limitations of the TFT. A low Ps value considerably simplifies the design of the TFT-based Active Matrix. Those skilled in the art will be aware that a high Ps results in reduced degrees of freedom within display design, for example, lower resolution, smaller display size, and potentially reduced aperture sizes, and ultimately precludes the use of amorphous Si-TFT. Simplified backplane circuitry enables larger aperture ratios (i.e., brighter displays) and lower cost.

The formulations of the present invention are specifically designed to have low spontaneous polarization (Ps values) to enable them to be used in active matrix backplane electro-optic devices. If the Ps value is too high, then the current flow produced during the electric field induced re-orientation of the mesogens from one optical state to the other, exceeds the plausible design space for the pixel circuitry's current driving capacity. As is well known to those skilled in the art, the Ps can be either positive or negative.

When values are given in this application, the number is intended to mean both the positive and the negative value. For example, a Ps of 10 nC/cm² means either +10 nC/cm² or −10 nC/cm².

The electro-optic response time of a ferroelectric liquid crystal may be determined by the following equation:

$$\tau \propto \eta/Ps \cdot E$$

where
$\tau$=the time required for the optical response to change from 10% to 90%.
E=the applied electric field which drives the change in the optical states
Ps=the spontaneous polarization
$\eta$=the rotational viscosity.

In practice, the response time should be as fast as possible, and preferably < about 500 microseconds, or < about 250 microseconds, or < about 100 microseconds, or < about 75 microseconds or < about 50 microseconds. The magnitude of the Ps of the formulation is limited by the backplane (for example, < about 50 nC/cm², or < about 40 nC/cm², or < about 30 nC/cm², or < about 20 nC/cm²), and the electric field necessary for switching should be as low as possible (for example, < about 30 V/µm, or < about 20 V/µm, or < about 15 V/µm, or < about 10 V/µm, or < about 5 V/µm). In addition to developing FLC formulations with Isotropic→SmA*→SmC* phase sequences on cooling, there is a need to minimize the rotational viscosities to optimize the electric field induced alignment and electro-optic response times for the low Ps systems (for example, < about 600 cP, or < about 400 cP, or < about 300 cP, or < about 200 cP, or < about 100 cP, or < about 50 cP). The tilt angle is typically either 22.5 degrees, ±6 degrees, or 22.5 degrees, ±4 degrees, or 22.5 degrees, ±2 degrees, or 45 degrees, ±6 degrees, or 45 degrees, ±4 degrees, or 45 degrees, ±2 degrees. The birefringence is typically greater than about 0.05, or greater than about 0.1.

Desirably, in devices made using the formulations of the present invention, the tilt angle of the liquid crystal formulation in the SmC* phase does not vary by more ±4 degrees across an operating temperature range. The operational temperature range is generally from the lower end of the SmC* range to about 5 degrees below the SmC* to SmA* phase transition. The operational temperature range will typically be from about 15° C. to about 30° C., or about 15° C. to about 35° C., or about 10° C. to about 40° C., or about 0° C. to about 45° C., or about −20° C. to about 55° C., or about −30° C. to about 75° C.

Previous applications (for example, the Crossland (WO 2005/019380) and Dow Corning (US2007/009035) applications) highlighted single component ferroelectric liquid crystals. However, the materials were not optimized for AMLCD. In practice, it is very difficult to design a single molecule which exhibits all the attributes required for use in AMLCD. The present invention provides methods to optimize these attributes via a formulation approach, which are more suited for use in AMLCD.

For example, in the case of a practical transmissive AMLCD, the careful design of formulations based upon oligosiloxane-modified liquid crystalline material(s) and the custom design of a suitable design primitive enable the formulations to demonstrate a number of desirable features. By "design primitive", we mean the integration of a liquid crystal formulation with suitable substrates, alignment layer technology, electrode structures, and polarizer technologies that are required to fabricate a basic FLC electro-optic device. Such devices are differentiated from existing ferroelectric liquid crystals devices by a combination of the composition of the formulation, the liquid crystal phase sequences, and the alignment properties. Favorable features for both AMLCD and PMLCD include:

1) A wide SmC* phase and, therefore, wide FLC operating temperature range, spanning ambient temperature. By wide we mean at least spanning about 15° C. to about 35° C. and preferably about 10° C. to about 40° C., or about 0° C. to about 50° C., or about −20° C. to about 60° C., or about −30° C. to about 80° C.

2) An alignment process which allows the formation of a liquid crystalline mono-domain, or near mono-domain, with a bookshelf geometry within the design primitive. The alignment process can be undertaken within the SmC* phase of formulated, nano-phase segregated, Isotropic→SmA*→SmC* systems, isothermally using suitable electric fields. This differs from the FLCD prior art, where specific overlying liquid crystal phases (specifically, nematic) and a carefully controlled cooling profile through the Isotropic→Nematic→Smectic A* and eventually into the SmC* phase is essential. The ability to use isothermal, electric field alignment in the SmC* phase enables the device to be re-aligned at will, during deployment, which is of great significance, as those skilled in the art will know that current ferroelectric liquid crystal devices may irreversibly lose alignment due to mechanical shock or temperature excursions where the liquid crystal becomes crystalline or isotropic.

3) A relatively narrow SmA* phase in order to maximize the SmC* range, and also to facilitate the isothermal electric field alignment of the device in the SmC* phase. By narrow, we mean < about 20° C., or < about 10° C., or < about 5° C. wide.

4) The resulting bookshelf structure should be stable during the operation and storage of the device. In cases where some degradation is observed, then the isothermal, electric alignment scheme employed for oligosiloxane ferroelectric liquid crystal formulations can be used to repair the alignment. Many conventional, all organic FLCs have claimed bookshelf, or pseudo bookshelf geometries, but these structures are not stable enough for deployment in devices. The bookshelf structures claimed here have enhanced integral stability within the design primitive. We have discovered that the enabling effect of the nano-phase segregated oligosiloxane-modified liquid crystalline molecules, as described for single component systems by Coles, Crossland, and Dow Corning, can be retained in suitably formulated systems. The nano-phase segregated bookshelf structure of a dual segment host stabilizes the structure. The pinning mechanism described by Canon is not required in nano-phase segregated oligosiloxane liquid crystal systems, and we have demonstrated the ability to achieve true bistability in systems which do not contain ABA (i.e., bi-mesogenic) species. Thus, the tri-segment (ABA) molecules used by Canon are not required for the stabilization of the formulations described here. However, tri-segment molecules may be used in the broadening of the SmC* temperature range in the present invention, if desired. The formulations which are the subject of this invention are also designed to minimize the impact of layer contraction at the SmA*→SmC* phase transition, thus eliminating layer buckling and zig-zag defect formation mechanisms. For example, the oligosiloxane formulations exhibit unusual combinations of properties, such as a limited change in the smectic layer spacing as detected by X-ray, and a very small change in birefringence at the SmA*→SmC* phase transition. A potential failure mode of conventional organic FLCDs is the loss of alignment if the FLC material is allowed to crystallize at low temperature, for example during storage or shipping. We have demonstrated that formulations can be developed which do not crystallize. These formulations have a wide SmX phase below the SmC* phase. The SmX phase is defined as a non-crystalline phase in which electro-optic switching ceases under the conditions defined herein, but in which the macroscopic molecular alignment of the bookshelf structure is retained at low temperature. Although the device is not operational in this phase, it becomes operational again when allowed to return to the operational temperature range.

5) The alignment quality and uniformity should be sufficient to enable the realization of high contrast ratios and bistability over the entire active area of a device. By high contrast, we mean equivalent or superior to commercial organic Isotropic→Nematic→SmA*→SmC* phase sequence formulations tested under equivalent conditions.

6) The tilt angle in the SmC* phase should be tuned to a specific value for the efficient operation of polarizer based electro-optic devices. For example, in the case of transmissive devices the optimum tilt angle is 22.5 degrees, ±6 degrees, or 22.5 degrees, ±4 degrees, or 22.5 degrees, ±2 degrees. Furthermore, the tilt angle should not change too dramatically within the operational temperature range of the device. The ability to design formulations with a range of tilt angles is also advantageous; for example, formulations with a tilt angle of 45 degrees, ±6 degrees, or 45 degrees, ±4 degrees, or 45 degrees, ±2 degrees, can also be used for phase modulating devices. It is surprising that additives such as those listed in Table 2, which have a longitudinal dipole, can be used to tune the tilt angle of a medium which utilizes a lateral dipole for switching, without degrading the electric field alignment or electro-optic switching processes.

7) The need for a low Ps has been noted above. Although a low Ps is a requirement of the TFT-based Active Matrix backplane technologies as currently exploited in commercial LCDs, this imposes a significant challenge for devices whose alignment is undertaken in a viscous smectic phase at, or near, ambient temperature using electric field alignment protocols. In addition to the alignment process, lower Ps can negatively impact response time of the liquid crystal device at fixed temperature and driving field.

8) For digital mode devices, true bistability is a requirement. By "true bistability", we mean the retention of the optical signal, within a specific tolerance, for some time after the removal of the switching field. An example of tolerance is that the optical signal should not degrade by more than about 20%, or by more than 10%, or by more than 5%. A short term relaxation to a plateau value may be acceptable, but a continuous decline in optical transmission is not acceptable. The acceptable time is dictated by the application and by the drive architecture and can range from minutes to milliseconds.

9) The birefringence of the formulation should be optimized based upon the design primitive, i.e., the AMLCD design. The birefringence is typically greater than about 0.05, or greater than about 0.1. The birefringence should not vary widely over the operational temperature range, for example the variation in birefringence of < about 100 ppm/° C., or < about 50 ppm/° C. between the lower end of the operational temperature range and about 5° C. below the SmC*—SmA* phase transition.

10) In our experience, formulations which do not exhibit a significant increase in birefringence upon cooling through the SmA to SmC phase transition (significance as defined by Giesselmann) as deduced from significant changes in the interference colors in the fan/broken fan textures as detected by polarized optical microscopy are favorable for device fabrication.

Practical FLC devices can be developed if formulations are designed which operate within the constraints defined above. As noted previously, while a considerable body of formulation experience exists for organic FLC systems based upon organic materials, such information cannot be directly transferred to the present oligosiloxane-based FLC formulations because of the combined impact of the following: i) the increased structural complexity of the nano-phase segregated structure exhibited by the oligosiloxane based systems covered herein; ii) the utilization of a specific phase sequence for the vast majority of organic FLCs, i.e., Isotropic→Nematic→SmA*→SmC* for organic systems; iii) the ability to observe reduced temperature dependence of Ps and tilt angle in oligosiloxane-based formulations; iv) the electric field alignment and layer rotation features of oligosiloxane-based formulations; v) the true bistability of oligosiloxane-based formulations; vi) the ability to tune tilt angle in nano-phase segregated systems; vii) the ability to design sub-SmC* phase properties which can avoid the disruption of the preferred molecular alignment at low temperatures; and viii) the ability to suppress nematic phase formation in oligosiloxane-modified ferroelectric liquid crystal formulations, for example, when 4-n-pentyl-4'-cyanobiphenyl (compound C5 in Table 1) or Felix 15/000 ("compound" C8 in Table 1) are added to smectic oligosiloxane systems.

One approach is to design formulations with an Isotropic→SmA*→SmC*→Crystal, or preferably an Isotropic→SmA*→SmC*→SmX phase sequence. We have discovered that materials with a wide range of phase behaviors can be used to develop formulations with the above phase sequences. Materials with phase sequences selected from, but not limited to, the following types can be used in formulation:
i) Isotropic→SmC*; ii) Isotropic→SmC; iii) Isotropic→SmA→SmC; iv) Isotropic→SmA*→SmC*; v) Isotropic→SmA; vi) Isotropic→Nematic; vii) monotropic liquid crystalline phases; viii) non liquid crystalline materials; etc. Not all of the materials used for formulation need to be oligosiloxane functionalized, provided there is sufficient oligosiloxane-organic hybrid material present to preserve the nano-phase segregated structure in the formulation.

In one embodiment of the invention, the properties of an Isotropic→SmA*→SmC* phase sequence oligosiloxane liquid crystal are tuned in the following manner.

1) The aromatic core is selected to reduce inter-molecular interactions, thus lowering the rotational viscosity of the final formulation.
2) The hydrocarbon chain separating the aromatic core from the siloxane is selected to provide optimum decoupling from the oligosiloxane, while providing a low regime (about 22.5 degrees) or high regime (about 45 degree) tilt angle.
3) The oligosiloxane is selected to be as short as possible to obtain the maximum possible birefringence, while maintaining the required phase properties.
4) A SmA material which does not in itself exhibit tilted phases can be added to reduce the effective tilt angle of the formulation, without inducing a broad SmA phase in the formulation, or without significantly degrading the electric field alignment of the formulation in the SmC* phase.
5) Several approaches can be taken to achieve a low overall Ps value. For examples, a mesogenic species of intrinsically low Ps can be made, achiral and chiral species can be formulated to set a Ps, or materials with opposing optical activity can be formulated to tune Ps.

Our investigations have shown that the selection and optimization of such formulations involves balancing the effects of different components. For example, an additive which is effective at reducing the tilt angle may not be as effective in reducing the rotational viscosity, or it may hinder the alignment of the sample.

Oligosiloxane-modified nano-phase segregating liquid crystalline materials used in the preparation of suitable formulations include, but are not limited to, the structures given below. Note that the oligosiloxane-modified nano-phase segregating liquid crystalline materials can be defined as AB (two segment adduct) or ABA (three segment adduct, also known as an LC dimer), where B=the siloxane segment and A=the aromatic liquid crystal core. ABA' structures are also given, where A and A' are non equivalent groups, leading to asymmetric structures.

I) Components which can be Use to Create the Nano-phase Segregated Smectic Phase (Generic Structures)

Among the oligosiloxane-modified liquid crystalline materials which can be used to create the nano-phase segregated smectic phase in the formulation are phenylbenzoates and biphenyls, terphenyls, and phenylpyrimidines. Examples of suitable materials are shown below.

1) Phenylbenzoates and Biphenyls

One class of compounds has the formula:

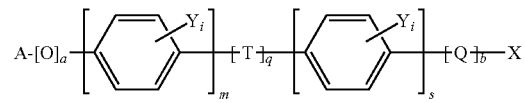

where a=0 or 1; m=1 or 2; s=1 or 2; q=0 or 1; b=0 or 1; i=0-4; T=O, COO, OCO, CH=N, N=CH, CF$_2$O, OCF$_2$, NHCO, CONH, CH$_2$, CH$_2$CH$_2$, C≡C, —CH=CH— or CF$_2$CF$_2$; Y is independently selected from halogen, NO$_2$, CN, CH$_3$, CF$_3$, OCF$_3$; Q=O, COO, or OCO; and X=an alkyl; or a substituted alkyl with at least one chiral centre, where individual chiral groups can be racemic or non-racemic, provided that the individual chiral groups are selected so that the liquid crystal formulation is non-racemic;

where, A is

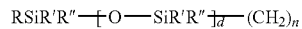

where n=3-15; d=1-5; R', and R" are independently selected from C$_r$H$_{(2r+1)}$, and r=1 to 4, or a phenyl group;

R is an alkyl group having from 1 to 10 carbon atoms or the group W, where W is

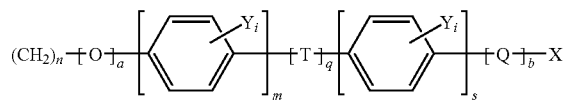

where n=3-15; a=0 or 1; m=1 or 2; s=1 or 2; q=0 or 1; b=0 or 1; i=0-4; T=O, COO, OCO, CH=N, N=CH, CF$_2$O, $OCF_2$, NHCO, CONH, $CH_2$, $CH_2CH_2$, C≡C, —CH=CH—, or $CF_2CF_2$; Y is independently selected from halogen, $NO_2$, CN, $CH_3$, $CF_3$, $OCF_3$; Q=O, COO, or OCO; and X=an alkyl; or a substituted alkyl with at least one chiral centre, where individual chiral groups can be racemic or non-racemic, provided that the individual chiral groups are selected so that the liquid crystal formulation is non-racemic.

The alkyl and substituted alkyl groups represented by X typically have from 2 to 20 carbon atoms. The substituted alkyls can be substituted with one or more of the following groups: further alkyl groups, halogens, epoxides, $NO_2$, CN, $CF_3$, or $OCF_3$.

2) Terphenyls

Another class of suitable compounds is terphenyls having the formula:

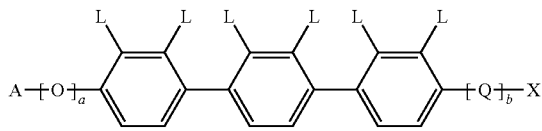

where a=0 or 1; b=0 or 1; L is independently selected from H, halogen, $NO_2$, CN, $CH_3$, $CF_3$, $OCF_3$; Q=O, COO, or OCO; and X=an alkyl; or a substituted alkyl with at least one chiral centre, where individual chiral groups can be racemic or non-racemic, provided that the individual chiral groups are selected so that the liquid crystal formulation is non-racemic;

where A is

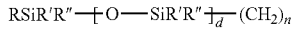

where n=3-15; d=1 to 5; R' and R" are independently selected from $C_rH_{(2r+1)}$ and r=1 to 4, or a phenyl group;

where R is an alkyl group having from 1 to 10 carbon atoms, or one of W" or W, as defined elsewhere, or W', where W' is

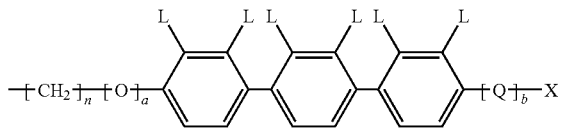

where n=3-15; a=0 or 1; b=0 or 1; L=is independently selected from H, halogen, $NO_2$, CN, $CH_3$, $CF_3$, $OCF_3$; Q=O, COO, or OCO; and X=an alkyl; or a substituted alkyl with at least one chiral centre, where individual chiral groups can be racemic or non-racemic, provided that the individual chiral groups are selected so that the liquid crystal formulation is non-racemic.

The alkyl and substituted alkyl groups represented by X typically have from 2 to 20 carbon atoms. The substituted alkyls can be substituted with one or more of the following groups: further alkyl groups, halogens, epoxides, $NO_2$, CN, $CF_3$, or $OCF_3$.

3) Phenyl Pyrimidines

Other classes of suitable compounds are phenyl (or biphenyl) pyrimidines having the formulas:

Type 1

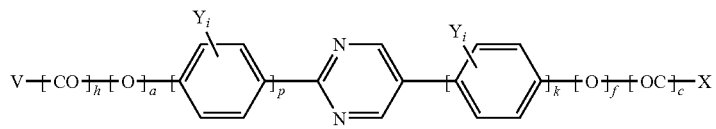

Type 2

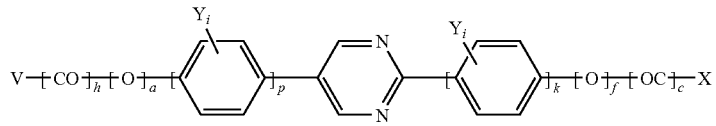

where a=0 or 1, p=0, 1 or 2, k=0, 1 or 2, f=0 or 1; h=0 or 1; c=0 or 1; i=0-4; with the proviso that if f=0, c=0; with the proviso that if a=0, h=0; Y is a halogen, $NO_2$, CN, $CH_3$, $CF_3$, or $OCF_3$;

where X=an alkyl; or a substituted alkyl with at least one chiral centre, where individual chiral groups can be racemic or non-racemic, provided that the individual chiral groups are selected so that the liquid crystal formulation is non-racemic;

where V is

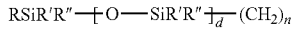

where n=3-15; d=1-5; and R' and R" are independently selected from $C_rH_{(2r+1)}$ and r=1-4, or a phenyl group;

where R is an alkyl group having from 1 to 10 carbon atoms, or W, or W', as defined elsewhere, or W", where W" is selected from one of the following groups to create a symmetrical or asymmetrical dimeric additive:

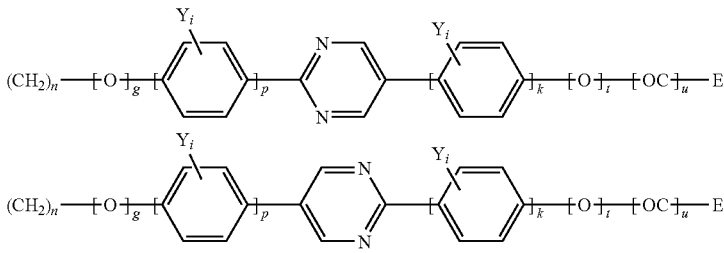

where n=3-15; g is 0 or 1; p is 0, 1 or 2; k is 0, 1 or 2; i=0-4; t is 0 or 1; u=0 or 1; with the proviso that when t=0, u=0; Y is independently selected from halogen, $NO_2$, CN, $CH_3$, $CF_3$, or $OCF_3$; E is an alkyl; or a substituted alkyl with at least one chiral centre, where individual chiral groups can be racemic or non-racemic, provided that the individual chiral groups are selected so that the liquid crystal formulation is non-racemic.

The alkyl and substituted alkyl groups represented by X and E typically have from 2 to 20 carbon atoms. The substituted alkyls can be substituted with one or more of the following groups: further alkyl groups, halogens, epoxides, $NO_2$, CN, $CF_3$, or $OCF_3$.

II) Components which can be Use to Tune the Properties of the Nano-phase Segregated Smectic Phase (Generic Structures)

The following classes of materials are useful as additives to formulations containing the oligosiloxane-modified nano-phase segregating liquid crystalline materials given above.

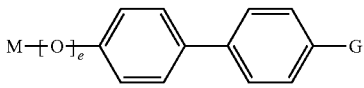

where e=0 or 1; G is H, a halogen, an epoxide, $NO_2$, CN, $CH_3$, $CF_3$, or $OCF_3$; M is an alkyl; or a substituted alkyl with at least one chiral centre, where individual chiral groups can be racemic or non-racemic, provided that the individual chiral groups are selected so that the liquid crystal formulation is non-racemic; or the group

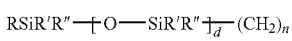

where n=3-15; d=1-5; and R' and R" are independently selected from $C_rH_{(2r+1)}$ and r=1-4, or a phenyl group; R is an alkyl group having from 1 to 10 carbon atoms, or Z, where Z is

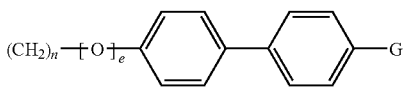

where n=3-15; e=0 or 1; G is H, a halogen, an epoxide, $NO_2$, CN, $CH_3$, $CF_3$, or $OCF_3$.

The alkyl and substituted alkyl groups represented by M typically have from 2 to 20 carbon atoms. The substituted alkyls can be substituted with one or more of the following groups: further alkyl groups, halogens, epoxides, $NO_2$, CN, $CF_3$, or $OCF_3$.

The following classes of materials may also be used as additives.

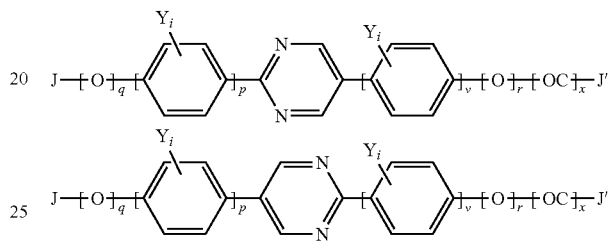

where r=0 or 1; p=0, 1 or 2; v=0, 1, or 2; x can be 0 or 1, q=0 or 1; i=0-4; with the proviso that when r=0, x=0; Y is independently selected from halogen, $NO_2$, CN, $CH_3$, $CF_3$, or $OCF_3$; J and J' are independently selected from an alkyl; or a substituted alkyl with at least one chiral centre, where individual chiral groups can be racemic or non-racemic, provided that the individual chiral groups are selected to ensure that the liquid crystal formulation is non-racemic.

The alkyl and substituted alkyl groups represented by J and J' typically have from 2 to 20 carbon atoms. The substituted alkyls can be substituted with one or more of the following groups: further alkyl groups, halogens, epoxides, $NO_2$, CN, $CF_3$, or $OCF_3$.

If the oligosiloxane-modified nano-phase segregating liquid crystalline components are achiral, then organic chiral molecules can also be used to induce chirality in the liquid crystal formulation.

EXAMPLES OF FORMULATIONS

Liquid crystals molecules (mesogens) are routinely formulated into complex mixtures. Such formulations enable property sets to be realized which would be difficult, or even impossible, to realize from a single molecule. The Crossland (WO 2005/019380) and Dow Corning patent applications (US 2007/009035) identified single component systems which exhibited electric field alignment and bistable switching; however, such molecules require formulation if they are to be used in wide temperature and active matrix backplane devices. The development of formulated systems based upon oligosiloxane-modified liquid crystals is complicated by the unusual micro-phase segregated nature of such materials. The examples given below illustrate how the phase sequence, temperature range of the SmC* phase, spontaneous polarization (Ps), and tilt angle may be controlled in such systems. The formulation of such materials can not be extrapolated from examples of organic FLCs, as the nano-phase segregated oligosiloxane region, which is absent in organic FLC systems, plays an important role in controlling the properties of the bulk formulation, and the electro-optic properties of devices fabricated from them.

The chemical structures of the components used in the different formulations are shown in Table 1. The formulations and their properties are shown in Tables 3-5. Table 2 shows the phase behavior of cyanobiphenyl based materials used for tilt angle tuning. Table 3 shows data for examples of binary formulations based upon an oligosiloxane-modified terphenyl mesogen with cyanobiphenyl mesogens and with an organic FLC formulation. Table 4 shows data for examples of oligosiloxane-modified terphenyl mesogens and cyanobiphenyl mesogens. Table 5 shows data for examples of oligosiloxane-modified phenylpyrimidines and various chiral oligosiloxane modified dopants.

Formulations were prepared by weighing components into a vessel and then heating the vessel to a temperature about 10° C. above the clearing temperature (liquid crystal to isotropic transition), or melting point in the case of a non liquid crystalline component, of the component with the highest transition temperature for the formation of an isotropic phase. Samples were held and mixed at this temperature for about 5-10 minutes, and were then allowed to cool down to ambient temperature. All compositions are listed as the mole percentage of each component unless otherwise stated. Formulations were initially characterized using a Differential Scanning Calorimeter (DSC). The temperature range of the DSC experiment was typically −40° C. to 120° C., unless the clearing phase transition temperature of the formulation was >100° C., in which case the upper temperature was increased. Fresh samples were heated into the isotropic phase (Heating run #1), then cooled to −40° C. (Cooling run #1), then heated back into the isotropic phase (Heating run #2) then cooled back to −40° C. (Cooling run #2), then heated back into the isotropic phase (Heating run #3), then cooled back to room temperature (Cooling run #3). Heating runs # 2 and #3 were used to define the phase transition temperatures, by selecting the peak temperature for each transition. Thermo-optic analysis using a polarizing optical microscope and a programmable hot stage system was undertaken in order to classify the type of liquid crystal phase present. The current reversal method as described by Miyasato et al., Japan Journal Applied Physics, 22, L661, (1983) for determining Ps was used to confirm the presence of an SmC* phase, and to identify the transition temperature boundaries of the SmC* phase. The thermo-optic and electro-optic measurements were undertaken in single pixel devices which were constructed using ITO glass substrates, separated with spacer beads and edge sealed with adhesive. Rubbed polyimide alignment layers were used in the devices. See FIG. 1.

FIG. 1 shows the structure of a typical bistable liquid crystal cell used to test the formulations. The liquid crystalline formulation 17 is placed between two substrates 10, 11. The substrates can be made of any suitable material, such as glass, silicon, organic polymers, or inorganic polymers, for example. One or both of the substrates can be transparent, depending on the class of device.

The inner surfaces of the substrates 10, 11 have electrodes 12, 13, e.g., aluminum or indium tin oxide (ITO), which can be applied in selected regions. One electrode can be on each substrate, or both electrodes can be on one of the substrates (but only one pair of electrode is required). One or both of the electrodes can be transparent, depending on the device. Alternatively, there can be electrodes providing fringing fields, enabling the electro-optic effects to be controlled. The inner surface of the electrode may be coated with a passivation layer, if desired.

The inner surface of the electrode (adjacent to the liquid crystal material), or the substrate in the case of the fringing field device, is coated with alignment layers 14, 15 in order to facilitate the electric field alignment, the layer orientation and the switching of the SmC* phase. The alignment layer can be an organic coating, or an inorganic coating. Suitable alignment layers include, but are not limited to, polyamide, polyimide, polyester, polytetrafluoroethylene, silicon oxides, silanes, and polysilanes. However, the exact choice of alignment layer material and its preparation conditions are important to realize good alignment and bistability, although the exact selections are dependent on the composition of the formulations. Preferred materials include polyimides with pre-tilt angles of < about 3 degrees; however other materials may also be used. Examples of materials which can be used include polyimides sold under the designations SE130, SE1410, SE8292, and RN1199, available from Nissan Chemical Industries. The alignment layer can be formed by any method known in the art, including, but not limited to, rubbing, stretching, deposition, and embossing. The alignment layer helps the monodomain to form (i.e., "the bookshelf"), and bistable switching to be observed. In order to achieve uniform alignment and bistability, the thickness of alignment layer should be < about 200 nm, or < about 100 nm, or < about 50 nm, or <25 nm.

Spacers 16 separate the substrates 10, 11, and define the cell thickness. A sealing layer 18 is used to retain the liquid crystal material in the cell. The liquid crystal electro-optic devices of the present invention typically have a cell gap designed to be in the range of 0.5 microns to 10 microns.

The laminated device can be placed between polarizers 19, 20 oriented at 90 degrees to each other (optic axis) to generate bright or dark states when the liquid crystal is switched between two states. The device described in FIG. 1 is a transmission mode device. Alternative polarizer configurations, known to those skilled in the art, may be used for transmission and reflective mode devices.

TABLE 1

Chemical structures of components used in formulations.

Compound Number | Structure
--- | ---
C1 | 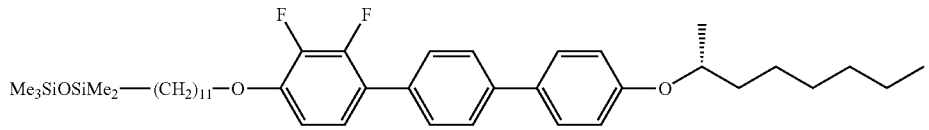

TABLE 1-continued

Chemical structures of components used in formulations.

| Compound Number | Structure |
|---|---|
| C2 | Me$_3$SiOSiMe$_2$—(CH$_2$)$_{11}$—O—[biphenyl]—[difluorophenyl(F,F)]—O—*CH(CH$_3$)—(CH$_2$)$_4$CH$_3$ |
| C3 | CH$_3$(CH$_2$)$_{11}$—[biphenyl]—CN |
| C4 | CH$_3$(CH$_2$)$_8$—[biphenyl]—CN |
| C5 | CH$_3$(CH$_2$)$_4$—[biphenyl]—CN |
| C6 | Me$_3$SiOSiMe$_2$—(CH$_2$)$_8$—O—[biphenyl]—CN |
| C7 | Me$_3$SiOSiMe$_2$—(CH$_2$)$_{10}$—O—[phenyl]—C(O)O—[phenyl]—O—C(O)—CH(F)—CH(CH$_3$)—CH$_2$CH$_3$ |
| C8 | Commercial organic FLC formulation purchased from AZ Electronics (Felix015/000). |
| C9 | CH$_3$(CH$_2$)$_7$—O—[phenyl]—[pyrimidine]—(CH$_2$)$_5$CH$_3$ |
| C10 | CH$_3$(CH$_2$)$_8$—[phenyl]—[pyrimidine]—(CH$_2$)$_9$CH$_3$ |
| C11 | Me$_3$SiOSiMe$_2$—(CH$_2$)$_8$—O—[phenyl]—[pyrimidine]—(CH$_2$)$_6$CH$_3$ |
| C12 | Me$_3$SiOSiMe$_2$—(CH$_2$)$_7$—O—[phenyl]—[pyrimidine]—(CH$_2$)$_6$CH$_3$ |
| C13 | Me$_3$SiOSiMe$_2$—(CH$_2$)$_9$—[pyrimidine]—[phenyl]—O—(CH$_2$)$_9$CH$_3$ |
| C14 | Me$_3$SiOSiMe$_2$—(CH$_2$)$_9$—[pyrimidine]—[phenyl]—O—CH$_2$—*CH(F)—(CH$_2$)$_3$CH$_3$ |

TABLE 2

Phase behavior of Cyanobiphenyl based materials used for tilt angle tuning.

| Compound | Phase Behavior |
|---|---|
| [C12H25-biphenyl-CN structure] | Crystal → 48° C. → SmA → 58.5° C. → Isotropic* |
| [C8H17-biphenyl-CN structure] | Crystal → 42° C. → SmA → 48° C. Nematic → 49.5° C. → Isotropic* |
| [C5H11-biphenyl-CN structure] | Crystal → 24° C. → Nematic → 35.3° C. → Isotropic* |
| $Me_3SiOSiMe_2$—$(CH_2)_8$—O-biphenyl-CN | Crystal → 37.0° C. → SmA → 59.0° C. → I** |

* BDH Data Sheet 851/PP/2.0/0686
** M. Ibn-Elhaj et al. J. Phys. II France, 1807-1817 (1993).

TABLE 3

Data for Binary blends based upon an oligosiloxane-modified terphenyl mesogen with cyanobiphenyl mesogens and with an organic FLC formulation.

| Formulation Number | Composition (by mole percentage) | Phase Sequence | Tilt Angle (degrees) | Ps (nC/cm$^2$) | Rotational Viscosity/cP |
|---|---|---|---|---|---|
| 1 | C1: 100 (neat) | SmX → 37.6 → SmC* → 85.5 → I | 39 (@40° C.) | 60 (@40° C.) | 950 (@ 40° C.) |
| 2 | C1: 90 C3: 10 | SmX → 32.7 → SmC* → 92.4 → I | 31 (@40° C.) | 51 (@40° C.) | 400 (@ 40° C.) |
| 3 | C1: 83 C3: 17 | SmX → 28.9 → SmC* → 74.8 → SmA* → 95.5 → I | 23 (@40° C.) | 35 (@40° C.) | 120 (@ 40° C.) |
| 4 | C3: 100 (neat) | Cr → 48.4 → SmA → 58.9 → I | NA | NA | NA |
| 5 | C1: 83 C4: 17 | SmX → 27.0 → SmC* → 74.2 → SmA* → 96.2 → I | 22 (@40° C.) | 31 (@40° C.) | 127 (@ 40° C.) |
| 6 | C1: 95 C5: 5 | SmX → 36.2 → SmC* → 88.4 → I | 38 (@40° C.) | 58 (@40° C.) | 490 (@ 40° C.) |
| 7 | C1: 90 C5: 10 | SmX → 32.0 → SmC* → 93.4 → I | 31 (@40° C.) | 46 (@40° C.) | 555 (@ 40° C.) |
| 8 | C1: 90 C6: 10 | SmX → 33.5 → SmC* → 90.3 → I | — | — | — |
| 9 | C1: 83 C6: 17 | SmX → 28.5 → SmC* → 85.2 → SmA* → 93.4 → I | 31 (@40° C.) | 45 (@40° C.) | 900 (@ 40° C.) |
| 10 | C1: 75 C6: 25 | SmX → 31.0 → SmC* → 74.7 → SmA* → 94.3 → I | 25 (@40° C.) | 32 (@40° C.) | 250 (@ 40° C.) |
| 11 | C1: 75 C8: 25 † | SmX → 21.4 → SmC* → 81.4 → I | 31 (@40° C.) | 35 (@40° C.) | 330 (@ 40° C.) |
| 12 | C1: 62.5 C8: 37.5 † | SmX → 15.5 → SmC* → 78.0 → SmA* → 80.0 → I | 26 (@40° C.) | 31 (@40° C.) | 96 (@ 40° C.) |

† N.B. Weight % used for this blend, because C16 is a pre-formulated liquid crystal additive.
[See Table 1 for chemical structures of individual components].

TABLE 4

Formulations based upon the oligosiloxane-modified terphenyl mesogens and cyanobiphenyl mesogens.

| Formulation Number | Composition (by mole percentage) | Phase Sequence | Tilt Angle (degrees) | Ps (nC/cm$^2$) | Rotational Viscosity/cP |
|---|---|---|---|---|---|
| 13 | C6 (neat) | Cr → 44.5 → SmA → 65.4 → I | NA | NA | NA |
| 14 | C1: 67.5 C6: 22.5 C7: 10 | SmX → 22.5 → SmC* → 74.0 → SmA* → 89.6 → I | 25 (@40° C.) | 8.5 (@40° C.) | — |

TABLE 4-continued

Formulations based upon the oligosiloxane-modified terphenyl mesogens and cyanobiphenyl mesogens.

| Formulation Number | Composition (by mole percentage) | Phase Sequence | Tilt Angle (degrees) | Ps (nC/cm$^2$) | Rotational Viscosity/cP |
|---|---|---|---|---|---|
| 15 | C1: 71.3<br>C6: 23.7<br>C9: 5 | SmX → 23.0 → SmC* → 74.7 → SmA* → 93.4 → I | 24 (@40° C.) | 28 (@40° C.) | 245 (@ 40° C.) |
| 16 | C1: 67.5<br>C6: 22.5<br>C9: 10 | SmX → 19.9 → SmC* → 71.0 → SmA* → 91.6 → I | 24 (@40° C.) | 25 (@40° C.) | 225 (@ 40° C.) |
| 17 | C1: 60<br>C6: 20<br>C9: 20 | SmX → 20.5 → SmC* → 67.5 → SmA* → 89.5 → I | 22 (@40° C.) | 27 (@40° C.) | 147 (@ 40° C.) |
| 18 | C1: 52<br>C6: 13<br>C9: 35 | SmX → 17.2 → SmC* → 61.2 → SmA* → 81.0 → I | 19 (@40° C.) | 19 (@40° C.) | 60 (@ 40° C.) |
| 19 | C1: 49<br>C6: 16<br>C9: 32<br>C13: 3 | SmX → 16.4 → SmC* → 61.7 → SmA* → 80.7 → I | 21.5 (@25° C.)<br>20 (@40° C.) | 18 (@25° C.)<br>20 (@40° C.) | 236 (@ 25° C.)<br>73 (@ 40° C.) |
| 20 | C1: 68<br>C3: 12<br>C9: 20 | SmX → 23.7 → SmC* → 76.5 → SmA* → 91.9 → I | 24 (@25° C.) | 28 (@25° C.) | 515 (@ 25° C.) |
| 21 | C2: 49<br>C6: 16<br>C9: 35 | SmX → −1.7 → SmC* → 65.3 → SmA* → 92.3 → I, | 17.5 (@40° C.) | 42 (@40° C.) | 50 (@ 40° C.) |

TABLE 5

Olisosiloxane-modified phenylpyrimidines and various chiral oligosiloxane modified dopants.

| Formulation Number | Composition (by mole percentage) | Phase Sequence | Tilt Angle (degrees) | Ps (nC/cm$^2$) | Rotational Viscosity/cP |
|---|---|---|---|---|---|
| 22 | C11: 100 (neat) | Cr → 16.9 → SmC → 45.6 → SmA → 54.3 → I | NA | NA | NA |
| 23 | C11: 95<br>C14: 5 | SmX → 22.0 → SmC* → 52.5 → I | 23(@25° C.) | 3(@25° C.) | 118 (@ 25° C.) |
| 24 | C11: 90<br>C14: 10 | SmX → −29.7 → SmC* → 51.7 → I | 26(@25° C.) | 10(@25° C.) | 147 (@ 25° C.) |
| 25 | C11: 85<br>C14: 15 | SmX → −29.2 → SmC* → 50.5 → I | 27(@25° C.) | 16(@25° C.) | 175 (@ 25° C.) |
| 26 | C11: 83.3<br>C6: 1.7<br>C14: 15 | SmX → −30.2 → SmC* → 47.2 → SmA → 51.7 → I | 25(@25° C.) | 15(@25° C.) | 149 (@ 25° C.) |
| 27 | C11: 76.5<br>C6: 8.5<br>C14: 15 | SmX → −34.2 → SmC* → 35 → SmA* → 56.7 → I | 14(@25° C.) | 6(@25° C.) | 29 (@ 25° C.) |
| 28 | C11: 76.5<br>C10: 8.5<br>C14: 15 | SmX → −24.8 → SmC* → 48.5 → SmA* → 51.9 → I | 23(@25° C.) | 11(@25° C.) | 73 (@ 25° C.) |
| 29 | C14: 100 (neat) | Cr → 50.3 → I | NA | NA | NA |
| 30 | C12: 85<br>C14: 15 | SmX → 21.0 → SmC* → 46.5 → SmA* → 51.7 → I | 18.5(@40° C.) | 9(@40° C.) | 27 (@ 40° C.) |

Example 1

I→SmC* phase sequence nano-phase segregated oligosiloxane-modified materials have low temperature dependence of tilt angle. However, the magnitude of the tilt angle is also important if a practical device is to be fabricated. In this example, we show that if the use of an achiral I→SmA material to adjust the magnitude of the tilt angle results in the introduction of a discrete SmA* phase, then the temperature dependence of the tilt angle can still be relatively low.

Compound C1 with I→SmC* phase sequence was mixed at various ratios with compound C6 which has I→SmA→Cr phase sequence. As C6 does not possess a SmC phase, it cannot be considered to be any form of de Vries SmA material. C6 also possesses a strong longitudinal dipole due to the cyano-biphenyl structure, unlike C1 where a strong transverse dipole behavior is present as suggested by ferroelectric switching. Retention of a SmC phase in the blend even with the addition of a longitudinal dipole molecule reflects the strong smectic structure enhancement by an oligosiloxane-modified liquid crystal. Several formulations with different amounts of C6 were prepared. Although C6 only exhibits a SmA phase, all of the formulations exhibited a SmC* phase. Also, all formulations exhibited a SmX phase below the SmC* phase.

| Formulation # | C1:C6 (mole ratio) | Phase Sequence | Tilt Angle (°) |
|---|---|---|---|
| — | 100:0 (neat C1) | I-C*-X | 38.8 |
| 8 | 90:10 | I-C*-X | 34.2 |
| 9 | 83:17 | I-A*-C*-X | 30.5 |

-continued

| Formulation # | C1:C6 (mole ratio) | Phase Sequence | Tilt Angle (°) |
|---|---|---|---|
| 10 | 75:25 | I-A*-C*-X | 25 |
| — | 0:100 (neat C6) | I-A-Cr | —‡ |

‡Not measured as no SmC phase; by definition of SmA, it should be 0.

The tilt angles of these formulations were measured in a 13 mm×16 mm liquid crystal cell as depicted in FIG. 1. The liquid crystal test cells were prepared in the following manner: an ITO coating was photo-patterned with 5 mm×5 mm active area with an adjoining contact pad for each of the electrodes so formed. The ITO coated glass had a $SiO_2$ coating between the glass substrate and the ITO coating, and the sheet resistance of ITO was the 100 ohm/square. A designated alignment agent was spin coated to a thickness of about 25 nm, cured, and then rubbed to form the alignment layer. Spacers of the desired size were blended with UV curable sealant at about 2% (by weight) loading, and this was applied at two edges of a cell on one of the substrates, on top of the alignment layer. It was laminated with another substrate without sealant application with the alignment layers facing inside and with an anti-parallel rubbing orientation. The two substrates were assembled in staggered fashion with 13 mm×13 mm substrates overlap and 5 mm×5 mm counter facing electrodes and with two opposing 3 mm ledges with contact pads for connection to electrical source. The assembly was pressed using vacuum press and irradiated with a UV light source to cure the sealant.

A transmissive liquid crystal device was prepared by filling a cell prepared using nylon as the alignment layer and 3 μm spacers with aforementioned formulations. The ports were then sealed with UV curable sealant, and wires were attached by soldering to contact pads for the opposing ITO electrodes to apply an electric field across the liquid crystal formulation.

Figure 2A:
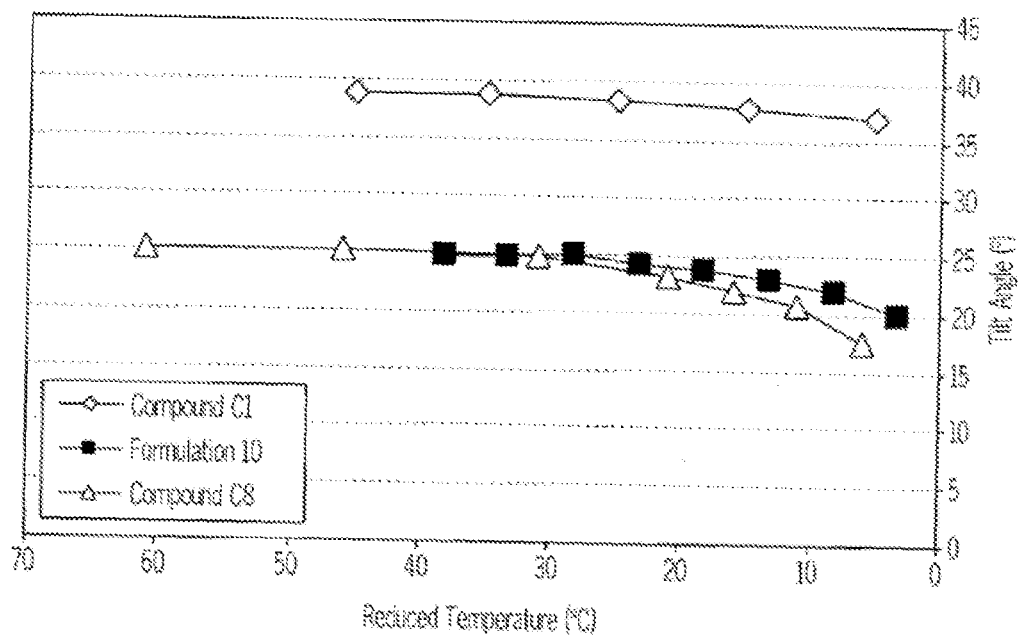
FIG. 2a is a graph showing tilt angle as a function of temperature.

The filled device was treated by the application of 800 Hz 10V/μm square wave at a temperature just below the upper limit of the SmC* phase resulting in a uniform alignment. This device was then characterized at 40° C., and the tilt angles were found to decrease with increasing amount of C6, illustrating the tilt angle tuning behavior of C6. Furthermore, the temperature dependence of the tilt angle for Formulation 10 (C1:C6=75:25) was found to show good stability with a variation within 5° (±2.5°) within the SmC* phase. FIG. 2a shows the temperature dependence of Formulation 10 along with that of parent component compound C1 and commercial organic FLC formulation C8 (Felix 015/000), illustrating superior temperature stability compared to the organic formulation.

Figure 2B:
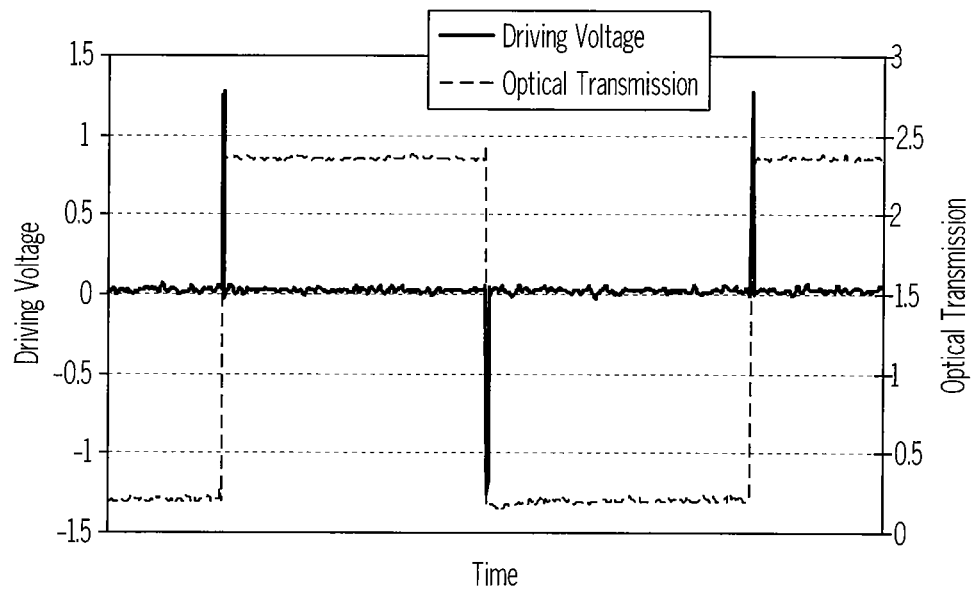
FIG. 2b is a graph showing drive voltage and optical transmission as a function of time.

The devices were also found to show good bistability, and FIG. 2b shows an example for the 75:25 formulation where the device was driven at 10 V/μm 670 μs wide bipolar pulses with a delay of 67 ms between the pulses.

Example 2

Compound C1 was mixed at a various ratios with compounds C3, C4, or C5. The phase sequence of C3, C4, and C5 are shown in Table 2 above, and none exhibits a SmC phase, thus they are not a form of de Vries SmA material. All of the formulations exhibited a strong tendency to form a smectic phase, and primarily a SmC* phase, which is indicative of the strong nano-phase segregation behavior of Si-FLCs.

Each formulation was filled in a liquid crystal test cell as described in Example 1. The tilt angles were measured at 40° C. and are tabulated below. While the organic SmA compounds exhibited a similar impact on the tilt angle in their blends with C1, the impact is stronger for a siloxane modified equivalent, compound C6, also tabulated below for comparison. Once again, the oligosiloxane modified liquid crystal showed an enhanced smectic structure stability. However, the compositional range of organic compounds was limited in that further addition narrowed the smectic C range of the formulation.

| Formulation # | Component | Composition | Phase Sequence | Tilt Angle (°) |
|---|---|---|---|---|
| 6 | C1:C5 | 95:5 | I-C*-X | 38 |
| 7 | C1:C5 | 90:10 | I-C*-X | 31 |
| 5 | C1:C4 | 83:17 | I-A*-C*-X | 21.8 |
| 2 | C1:C3 | 90:10 | I-C*-X | 30.8 |
| 3 | C1:C3 | 83:17 | I-A*-C*-X | 23 |
| 8 | C1:C6 | 90:10 | I-C*-X | 34.2 |
| 9 | C1:C6 | 83:17 | I-A*-C*-X | 30.5 |

Example 3

Compound C1 with I→SmC* phase behavior was mixed at various ratios with Compound C8, a commercial FLC Felix 015/000 (available from AZ Electronic Materials) which exhibits an I→N→SmA*→SmC* phase sequence. The phase sequence of the formulations was I→SmA*→SmC* when the C8 content was greater than 25 weight percent, below which the formulation exhibited I→SmC* phase behavior. A device containing neat C8 exhibited zig-zag defects when aligned, indicating layer shrinkage upon the SmA*→SmC* phase transition, thus suggesting that it is not any form of de Vries SmA material. Hence, none of these formulations contains any form of de Vries component.

| Formulation # | C1:C8 (weight ratio) | Phase Sequence |
|---|---|---|
| — | 0:100 (neat C8) | I-N-A*-C* |
| 12 | 62.5:37.5 | I-A*-C* |
| 11 | 75:25 | I-C* |
| — | 100:0 (neat C1) | I-C* |

Figure 3A:
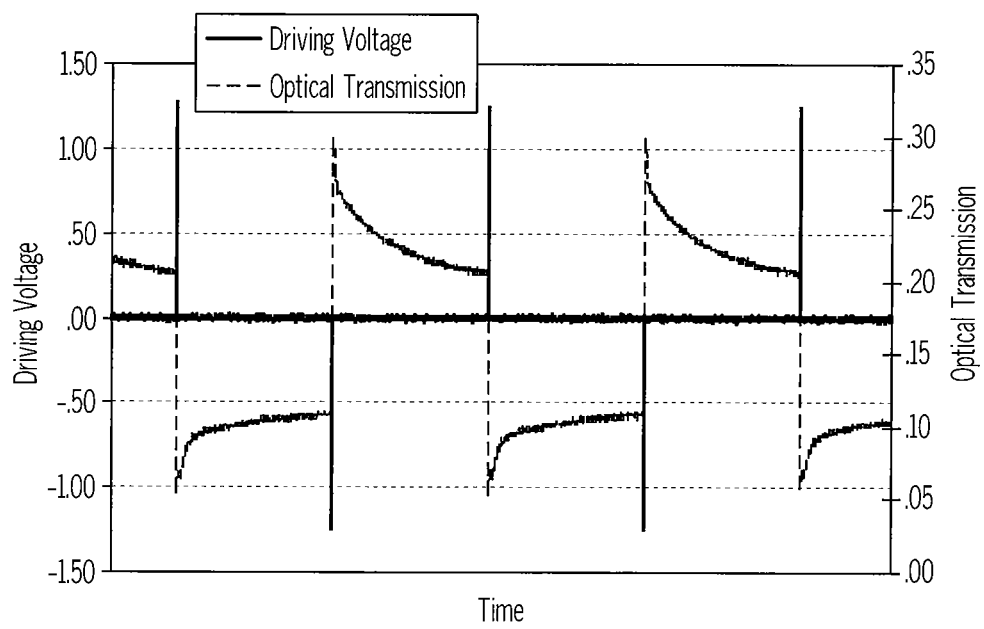
FIGS. 3a and 3b are graphs showing drive voltage and optical transmission as a function of time.
Figure 3B:
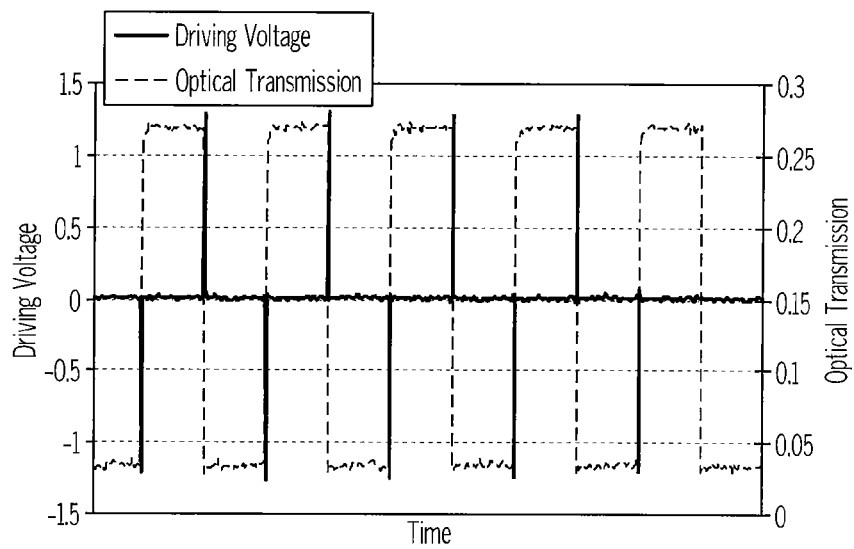

As expected, bistability was not observed in C8, as illustrated by the continuing decay of the transmission profile after the removal of the electrical field as shown in FIG. 3a. On the other hand, the I→SmA*→SmC* Formulation 12 at 62.5:37.5 weight ratio of C1 to C8 showed good bistability when applying 200 μs wide 10 V/μm bipolar pulses with 19 ms delay between pulses (FIG. 3b), exemplifying the ability of oligosiloxane FLC formulations to exhibit bistability without including a component exhibiting any form of de Vries smectic A behavior.

Example 4

An oligosiloxane liquid crystal composition Formulation 17 was prepared by mixing the following compounds at the composition shown in the table below. The resulting formulation was characterized to have the phase sequence as shown in Table 4 with the SmC* range spanning between 17 and 61° C.

| Formulation 17 | Molar composition |
| --- | --- |
| C1 | 60 |
| C6 | 20 |
| C9 | 20 |

Figure 4A:
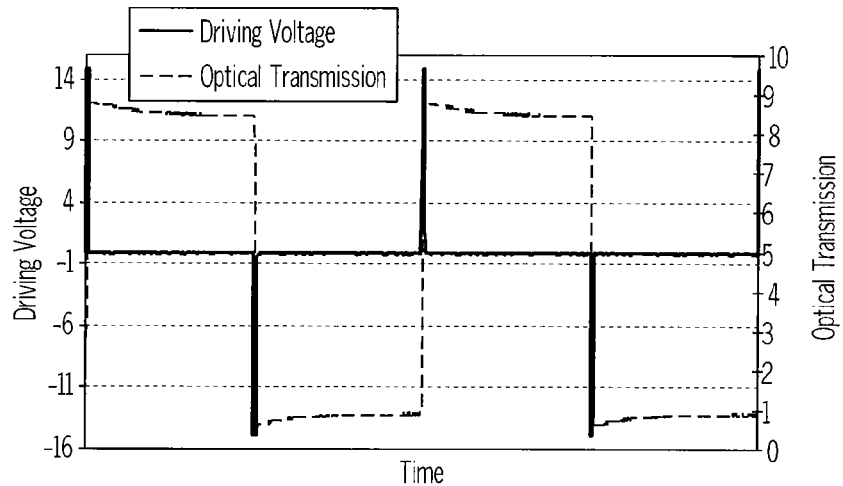
FIG. 4a is a graph showing drive voltage and optical transmission as a function of time.
Figure 4B:
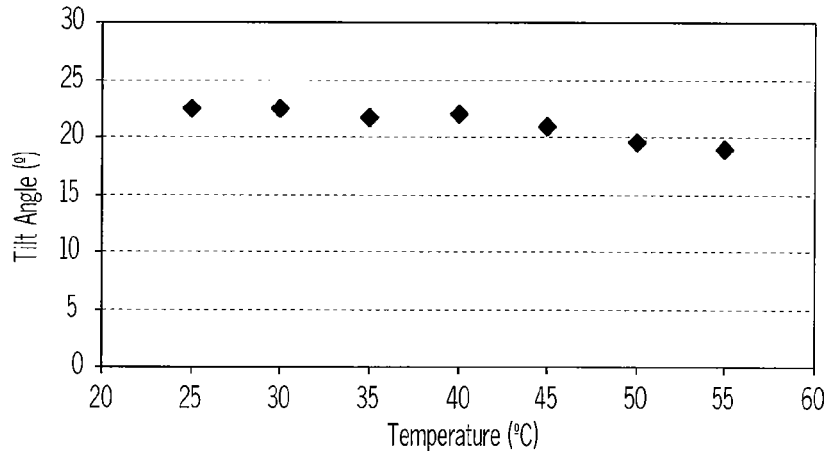
FIG. 4b is a graph showing tilt angle as a function of temperature.

A transmissive liquid crystal device was prepared by filling a cell with Formulation 17 as described in Example 1. The device was filled in the isotropic phase and then cooled into the SmC* phase where it was isothermally aligned by the application of a 30 Hz 13V/μm square wave, resulting in the formation of uniform alignment with a contrast ratio of 35:1. A commercial organic ferroelectric liquid crystal material C8 (Felix 015/000) showed a contrast ratio of 26:1 under the same contrast ratio measurement conditions. This device containing Formulation 17 was then characterized at 40° C. and was found to show voltage-on to 90% transmission response time of 75 μs, and Ps of 27 nC/cm². The device showed good bistability with >90% signal retained when driven by application of 200 μs wide 5.6 V/μm bipolar pulses with 10 ms between pulses (FIG. 4a). The tilt angle was measured to be 21.5° and was found to vary within ±2.5° between 25° C. and 55° C., showing good temperature stability of tilt angle (FIG. 4b).

Example 5

An oligosiloxane liquid crystal composition Formulation 19 was prepared by mixing the following compounds at the composition shown in the table below. The resulting formulation was characterized to have the phase sequence as shown in Table 4 with the SmC* range spanning between 16 and 62° C.

| Formulation 19 | Molar Composition |
| --- | --- |
| C1 | 49 |
| C6 | 16 |
| C9 | 32 |
| C13 | 3 |

A transmissive liquid crystal device was prepared by filling a cell with Formulation 19 as described in Example 1. The device was filled in the isotropic phase and then cooled into the SmC* phase where it was isothermally aligned by the application of a 17 kHz 10 V/μm square wave, resulting in formation of uniform alignment within a few minutes with a contrast ratio of 11:1. This device was then characterized at 40° C. and was found to show voltage-on to 90% transmission response time of 64 μs, Ps of 20 nC/cm², and tilt angle of 20°.

The device was also cooled to sub-SmC* temperature where ferroelectric switching had ceased. The device was then reheated to 40° C., and the contrast ratio was measured to be 11:1, indicating retention of the SmC* alignment.

Example 6

An oligosiloxane liquid crystal composition Formulation 20 was prepared by mixing the following compounds at the composition shown in the table below. The resulting formulation was characterized to have the phase sequence as shown in Table 4 with the SmC* range spanning between 24 and 76° C.

| Formulation 20 | Molar Composition |
| --- | --- |
| C1 | 68 |
| C3 | 12 |
| C9 | 20 |

Figure 5:
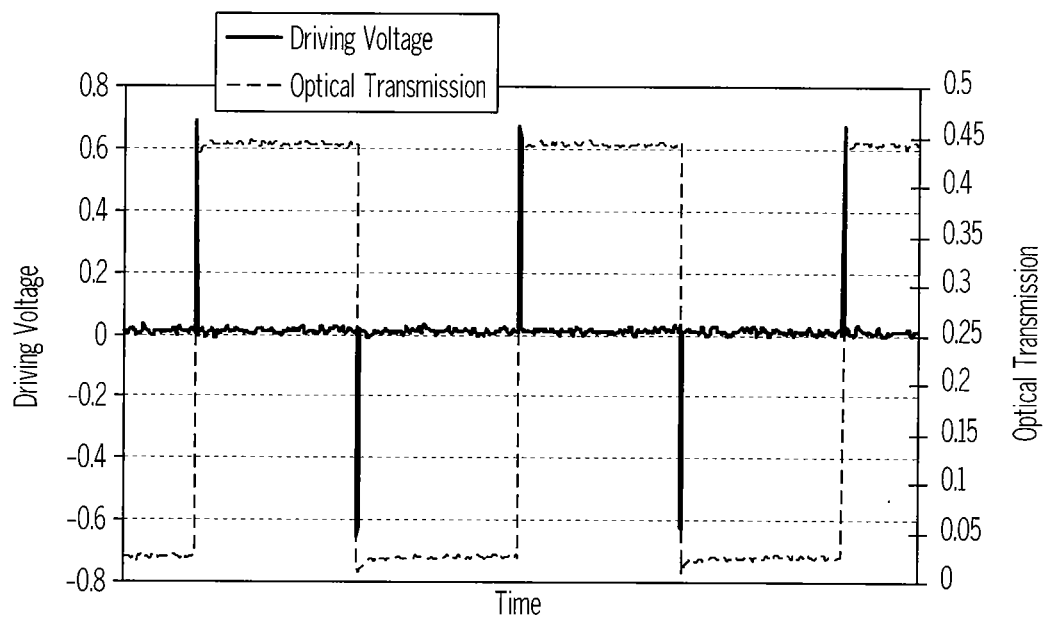
FIG. 5 is a graph showing drive voltage and optical transmission as a function of time.

A transmissive liquid crystal device was prepared by filling a cell with Formulation 20 as described in Example 1, but with a polyimide alignment layer. The device was filled in the isotropic phase and then cooled into the SmC* phase where it was isothermally aligned by the application of a 380 Hz 26 V/μm square wave, resulting in formation of uniform alignment with an excellent contrast ratio of 69:1. This device was then characterized at 40° C. and was found to show voltage-on to 90% transmission response time of 69 μs, Ps of 30 nC/cm², and tilt angle of 22°. Good bistability with >95% signal retention after 20 ms was achieved while driving the device with 10 V/μm 200 μs pulse (FIG. 5).

The device was cooled to a temperature below the SmC* phase where optical switching ceased, then reheated to 40° C. to determine the low temperature robustness of the SmC alignment. The contrast ratio was found to be retained at 69:1 with virtually no change in the dark and bright state transmission, showing excellent alignment stability.

Example 7

An oligosiloxane liquid crystal composition Formulation 26 was prepared by mixing the following compounds at the composition shown in the table below. The resulting formulation was characterized to have the phase sequence as shown in Table 5 with the SmC* range spanning between −30 and 47° C.

| Formulation 26 | Molar composition |
| --- | --- |
| C11 | 83.3 |
| C6 | 1.7 |
| C14 | 15 |

Figure 6:
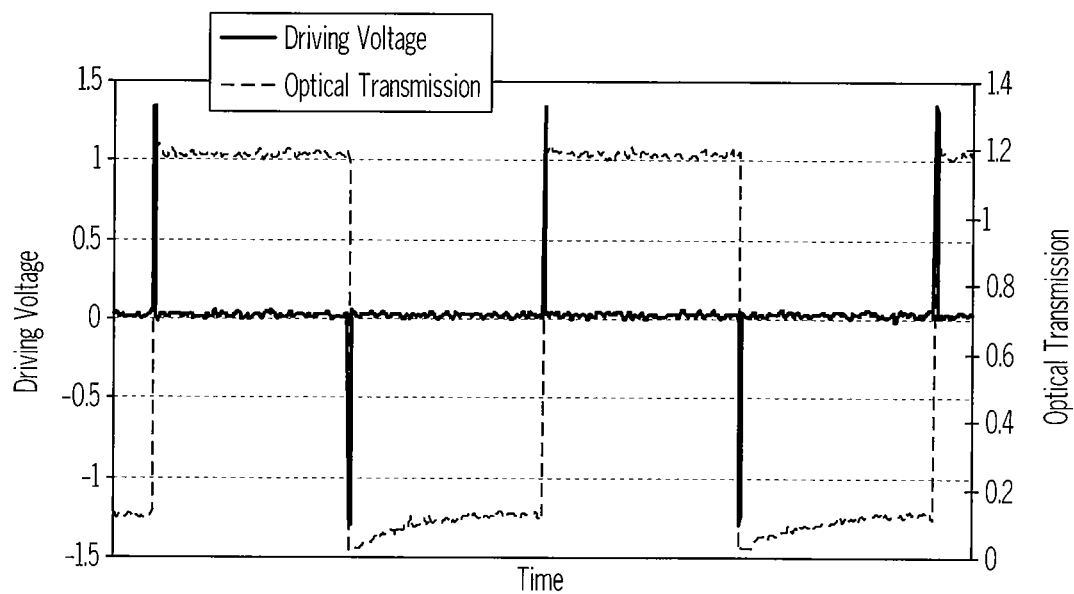
FIG. 6 is a graph showing drive voltage and optical transmission as a function of time.

A transmissive liquid crystal device was prepared by filling a cell with Formulation 26 as described in Example 1, but with a polyimide alignment layer. Treatment of the filled device by application of 30 Hz 10 V/μm square wave while being held at ambient temperature resulted in formation of uniform alignment with a smooth dark state texture and a high contrast ratio of 62:1. This device was characterized at 25° C. and was found to show voltage-on to 90% transmission response time of 125 μs, Ps of 15 nC/cm², and tilt angle of 25°. This device showed reasonable bistability with slight relaxation for one state, while other state showed excellent bistability when driven with 230 μs wide 10 V/pm bipolar pulses with 23 ms delay between pulses (FIG. 6).

The device was also cooled to sub-SmC* temperature where optical switching had ceased, then reheated to 25° C. to check alignment retention upon cooling. The contrast ratio was measured to be 60:1, indicating robustness of aligned SmC* domain.

Example 8

An oligosiloxane liquid crystal composition Formulation 28 was prepared by mixing the following compounds at the composition shown in the table below. The resulting formulation was characterized to have the phase sequence as shown in Table 5 with the SmC* range spanning between −25 and 48° C.

| Formulation 28 | Molar composition |
|---|---|
| C11 | 76.5 |
| C10 | 8.5 |
| C14 | 15 |

A transmissive liquid crystal device was prepared by filling Formulation 28 into a cell as described in Example 1, but with a polyimide alignment layer. Treatment of the filled device by application of 30 Hz 10 V/μm square wave while being held at ambient temperature resulted in formation of uniform alignment with a contrast ratio of 50:1. This device was then characterized at 25° C. and was found to show voltage-on to 90% transmission response time of 85 μs, Ps of 11 nC/cm², and tilt angle of 23°.

While certain representative embodiments and details have been shown for purposes of illustrating the invention, it will be apparent to those skilled in the art that various changes may be made without departing from the scope of the invention, which is defined in the appended claims.

The invention claimed is:

1. A liquid crystal formulation comprising:
   a blend of a first oligosiloxane-modified nano-phase segregating liquid crystalline material; and at least one additional material selected from a second oligosiloxane-modified nano-phase segregating liquid crystalline material, non-liquid crystalline oligosiloxane-modified materials, organic liquid crystalline materials, or non-liquid crystalline materials,
   wherein the liquid crystal formulation has an I→SmA*→SmC* phase transition with a SmC* temperature range from about 15° C. to about 35° C., a tilt angle of about 22.5°±6° or about 45°±6°, a spontaneous polarization of less than about 50 nC/cm², and a rotational viscosity of less than about 600 cP
   wherein the first oligosiloxane-modified nano-phase segregating liquid crystalline material is a terphenyl, a phenyl pyrimidine, a biphenyl pyrimidine, or biphenyls; and
   wherein phenyl pyrimidine or biphenyl pyrimidine has a formula:

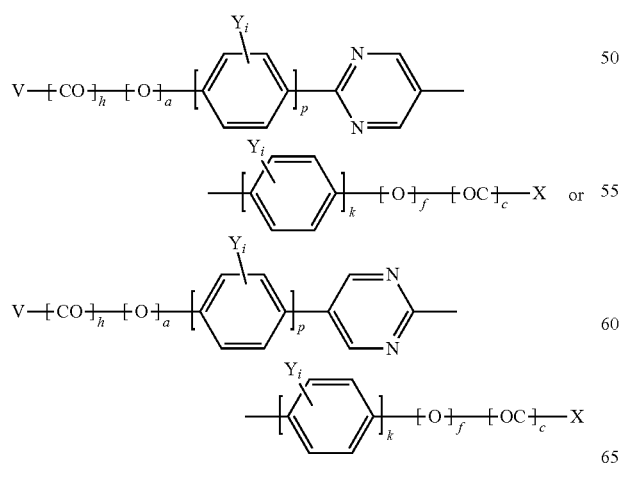

where:
a=0 or 1; p=0, 1 or 2; k=0, 1, or 2; f=0 or 1; h=0 or 1; i=0-4; c=0 or 1; with the proviso that if f=0, c=0; with the proviso that if a=0, h=0; Y is independently selected from halogen, $NO_2$, CN, $CH_3$, $CF_3$, or $OCF_3$;

where X=an alkyl; or a substituted alkyl with at least one chiral centre, where individual chiral groups can be racemic or non-racemic, provided that the individual chiral groups are selected so that the liquid crystal formulation is non-racemic;

where V is

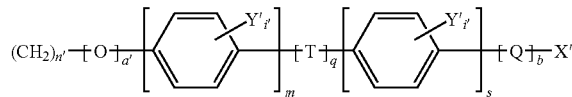

where n=3-15; d=1-5; and R' and R" are independently selected from $C_rH_{(2r+1)}$ and r=1-4, or a phenyl group;

R is an alkyl group having from 1 to 10 carbon atoms, or one of W, W', or W", where
W is

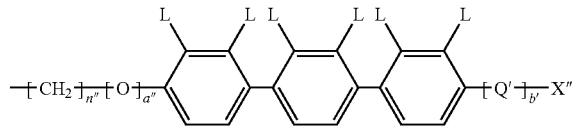

where n'=3-15; a'=0 or 1; m=1 or 2; s=1 or 2; q=0 or 1; b=0 or 1; i'=0-4; T=O, CH=N, N=CH, $CF_2O$, $OCF_2$, NHCO, CONH, $CH_2$, $CH_2CH_2$, C≡C, —CH=CH—, or $CF_2CF_2$; Y' is independently selected from halogen, $NO_2$, CN, $CH_3$, $CF_3$, $OCF_3$; Q=O, COO, or OCO; and X'=an alkyl; or substituted alkyl with at least one chiral centre, where individual chiral groups can be racemic or non-racemic, provided that the individual chiral groups are selected so that the liquid crystal formulation is non-racemic;

W' is

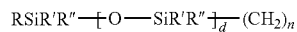

where n"=3-15; a"=0 or 1; b'=0 or 1; L is independently selected from H, halogen, $NO_2$, CN, $CH_3$, $CF_3$, $OCF_3$; Q'=O, COO, or OCO; and X"=an alkyl; or substituted alkyl with at least one chiral centre, where individual chiral groups can be racemic or non-racemic, provided that the individual chiral groups are selected so that the liquid crystal formulation is non-racemic; and W" is one of

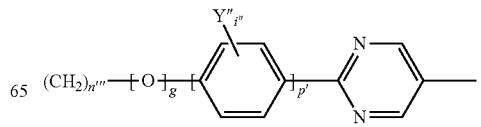

-continued

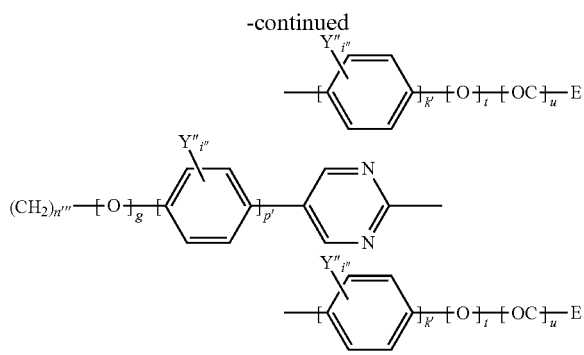

where n'''=3-15; g=0 or 1; p'=0, 1 or 2; k' is 0, 1 or 2; i''=0-4; t is 0 or 1; u=0 or 1; with the proviso that when t=0, u=0; Y'' is independently selected from halogen, $NO_2$, CN, $CH_3$, $CF_3$, or $OCF_3$; E is an alkyl; or substituted alkyl with at least one chiral centre, where individual chiral groups can be racemic or non-racemic, provided that the individual chiral groups are selected so that the liquid crystal formulation is non-racemic;
wherein terphenyl has a formula:

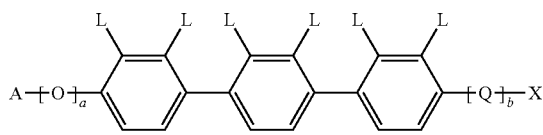

where a=0 or 1; b=0 or 1; L is independently selected from H, halogen, $NO_2$, CN, $CH_3$, $CF_3$, $OCF_3$; Q=O, COO, or OCO; X=an alkyl; or substituted alkyl with at least one chiral centre, where individual chiral groups can be racemic or non-racemic, provided that the individual chiral groups are selected so that the liquid crystal formulation is non-racemic;
where A is

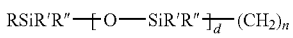

where n=3-15; d=1-5; R' and R'' are independently selected from $C_rH_{(2r+1)}$ and r=1-4, or a phenyl group; R is an alkyl group having from 1 to 10 carbon atoms, or one of W, W' or W'',
where W is

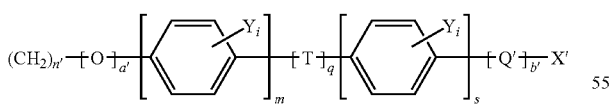

where n'=3-15; a'=0 or 1; m=1 or 2; s=1 or 2; q=0 or 1; b'=0 or 1; i=1-4; T=O, CH=N, N=CH, $CF_2O$, $OCF_2$, NHCO, CONH, $CH_2$, $CH_2CH_2$, C≡C, —CH=CH—, or $CF_2CF_2$; Y is independently selected from halogen, $NO_2$, CN, $CH_3$, $CF_3$, $OCF_3$; Q'=O, COO, or OCO; and X'=an alkyl; or substituted alkyl with at least one chiral centre, where individual chiral groups can be racemic or non-racemic, provided that the individual chiral groups are selected so that the liquid crystal formulation is non-racemic;

W' is

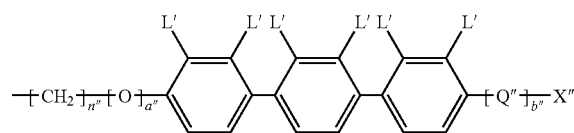

where n''=3-15; a''=0 or 1; b''=0 or 1; L'=is independently selected from H, halogen, $NO_2$, CN, $CH_3$, $CF_3$, $OCF_3$; where Q''=O, COO, or OCO; and X''=an alkyl; or substituted alkyl with at least one chiral centre, where individual chiral groups can be racemic or non-racemic, provided that the individual chiral groups are selected so that the liquid crystal formulation is non-racemic; and
W'' is one of

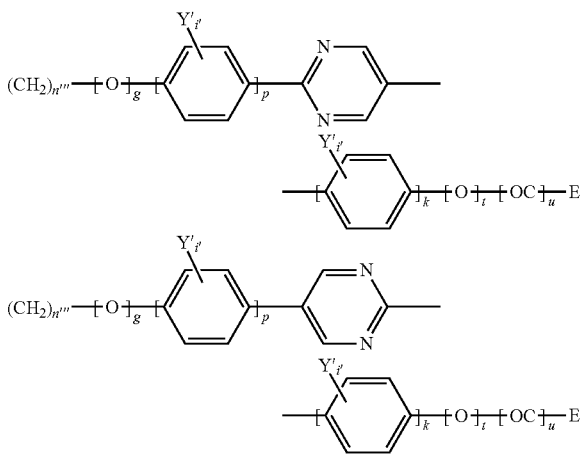

where n'''=3-15; g=0 or 1; p=0, 1 or 2; k is 0, 1 or 2; i'=0-4; t is 0 or 1; u=0 or 1; with the proviso that when t=0, u=0; Y' is independently selected from halogen, $NO_2$, CN, $CH_3$, $CF_3$, or $OCF_3$; E is an alkyl; or substituted alkyl with at least one chiral centre, where individual chiral groups can be racemic or non-racemic, provided that the individual chiral groups are selected so that the liquid crystal formulation is non-racemic;
wherein the biphenyls have a formula:

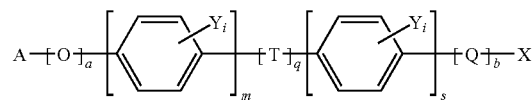

where a=0 or 1; m=1 or 2; s=1 or 2; q=0 or 1; b=0 or 1; i=0-4; T=O, CH=N, N=CH, $CF_2O$, $OCF_2$, NHCO, CONH, $CH_2$, $CH_2CH_2$, C≡C, —CH=CH— or $CF_2CF_2$; Y is independently selected from halogen, $NO_2$, CN, $CH_3$, $CF_3$, $OCF_3$; Q=O, COO, or OCO; and X=an alkyl; or substituted alkyl with at least one chiral centre, where individual chiral groups can be racemic or non-racemic, provided that the individual chiral groups are selected so that the liquid crystal formulation is non-racemic;

A is

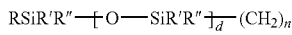

where n=3-15; d=1-5; R', and R" are independently selected from $C_rH_{(2r+1)}$ and r=1-4, or a phenyl group; R is an alkyl group having from 1 to 10 carbon atoms or the group W,
where W is

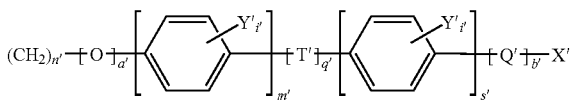

where n'=3-15; a'=0 or 1; m'=1 or 2; s'=1 or 2; q'=0 or 1; b'=0 or 1; i'=0-4;
where T'=O, CH=N, N=CH, $CF_2O$, $OCF_2$, NHCO, CONH, $CH_2$, $CH_2CH_2$, C≡C, —CH=CH—, or $CF_2CF_2$; Y' is independently selected from halogen, $NO_2$, CN, $CH_3$, $CF_3$, $OCF_3$; Q'=O, COO, or OCO; and X'=an alkyl; or substituted alkyl with at least one chiral centre, where individual chiral groups can be racemic or non-racemic, provided that the individual chiral groups are selected so that the liquid crystal formulation is non-racemic;

and the second oligosiloxane-modified nano-phase segregating liquid crystalline material is either selected as a terphenyl, a phenyl pyrimidine, a biphenyl pyrimidine, or a biphenyl that corresponds to the formulas described above, or as a compound having a formula

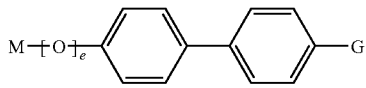

where e=0 or 1; G is H, halogen, an epoxide, $NO_2$, CN, $CH_3$, $CF_3$, or $OCF_3$; M is the group

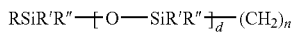

where n=3-15; d=1-5; and R' and R" are independently selected from $C_rH_{(2r+1)}$ and r=1-4, or a phenyl group; R is an alkyl group having from 1 to 10 carbon atoms, or Z, where Z is

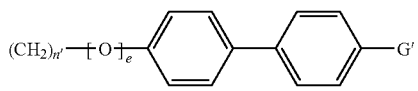

where n'=3-15; e'=0 or 1; G' is H, halogen, an epoxide, $NO_2$, CN, $CH_3$, $CF_3$, or $OCF_3$.

2. The liquid crystal formulation of claim 1 wherein the at least one additional material is selected from the organic liquid crystalline materials or non-liquid crystalline materials and has a formula

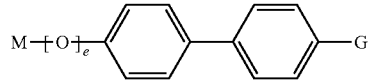

where e=0 or 1; G is H, halogen, an epoxide, $NO_2$, CN, $CH_3$, $CF_3$, or $OCF_3$; M is an alkyl or substituted alkyl with at least one chiral centre, where individual chiral groups can be racemic or non-racemic, provided that the individual chiral groups are selected so that the liquid crystal formulation is non-racemic.

3. The liquid crystal formulation of claim 1 wherein the at least one additional material is selected from the organic liquid crystalline materials or non-liquid crystalline materials and has a formula of one of:

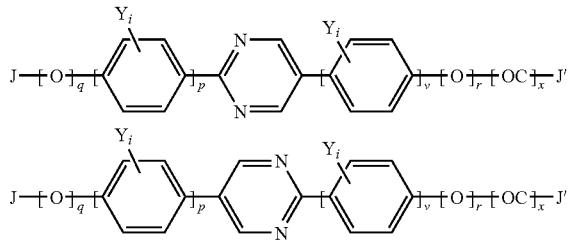

where r=0 or 1; p=0, 1 or 2; v=0, 1, or 2; x=0 or 1; q=0 or 1; i=0-4; with the proviso that when r=0, x=0; Y is independently selected from halogen, $NO_2$, CN, $CH_3$, $CF_3$, or $OCF_3$; J and J' are independently selected from an alkyl; or substituted alkyl with at least one chiral centre, where individual chiral groups can be racemic or non-racemic, provided that the individual chiral groups are selected to ensure that the liquid crystal formulation is non-racemic.

4. The liquid crystal formulation of claim 1 wherein the liquid crystal formulation has an I→SmA*→SmC*→Cr phase transition sequence or an I→SmA*→SmC*→SmX phase transition sequence.

5. The liquid crystal formulation of claim 1 wherein the first or second oligosiloxane-modified nano-phase segregating liquid crystalline material has an ABA structure.

6. The liquid crystal formulation of claim 1 wherein the liquid crystal formulation has a birefringence of more than 0.05.

7. The liquid crystal formulation of claim 1 wherein the liquid crystal formulation does not exhibit a significant change in the interference color viewed by a polarizing optical microscope when passing through the SmA*→SmC* phase transition.

8. A device containing a liquid crystal formulation of claim 1, the device having a stable bookshelf geometry, bistable switching, and where an isothermal electric field alignment in the SmC* phase is used to prepare the device, the device having a response time of less than 500 μs when switched between two stable states, and an electric drive field of less than 30 V/μm.

9. The device of claim 8 comprising:
at least one liquid crystal cell comprising:
a pair of substrates having a gap therebetween;
a pair of electrodes, the pair of electrodes positioned on one of the substrates or one electrode positioned on each substrate; and the liquid crystal formulation disposed in the gap between the pair of substrates.

10. The device of claim 9 further comprising at least one polarizer.

11. The device of any claim 9 wherein the device further comprises a rubbed alignment layer.

12. The device of any claim 11 wherein the alignment layer has a thickness less than about 200 nm.

13. The device of any claim 8 having a response time of less than about 100 μs when switched between two stable states.

14. The device of any claim 8 wherein the device has a contrast ratio of at least 10:1 in the case where the tilt angle is 22.5 degrees ±6 degrees.

15. The device of any claim 8 wherein the device has a relaxation of less than about 10% in transmission intensity after 20 ms after removal of the electric drive field.

16. The device of any claim 8 wherein the tilt angle of the liquid crystal formulation in the SmC* phase does not vary by more than ±4 degrees across an operating temperature range.

17. A method of adjusting a tilt angle of a liquid crystal formulation comprising:
providing a first oligosiloxane-modified nano-phase segregating liquid crystalline material; and
blending the first oligosiloxane-modified nano-phase segregating liquid crystalline material with an additional material, so that the liquid crystal formulation has an I→SmA*→SmC* phase transition with a SmC* temperature range from 15° C. to 35° C., a tilt angle of 22.5°±6° or 45°±6°, a spontaneous polarization of less than 50 nC/cm$^2$, and a rotational viscosity of less than 600 cP;
wherein the first oligosiloxane-modified nano-phase segregating liquid crystalline material are biphenyls, a terphenyl, a phenyl pyrimidine, or a biphenyl pyrimidine; and
wherein the phenyl pyrimidine or biphenyl pyrimidine has a formula:

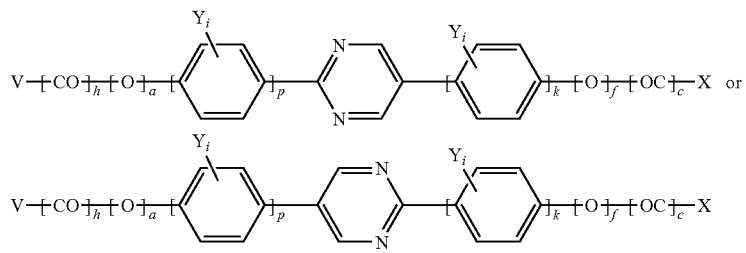

where:
a=0 or 1; p=0, 1 or 2; k=0, 1, or 2; f=0 or 1; h=0 or 1; i=0-4; c=0 or 1; with the proviso that if f=0, c=0; with the proviso that if a=0, h=0; Y is independently selected from halogen, NO$_2$, CN, CH$_3$, CF$_3$, or OCF$_3$;
where X=an alkyl; or a substituted alkyl with at least one chiral centre, where individual chiral groups can be racemic or non-racemic, provided that the individual chiral groups are selected so that the liquid crystal formulation is non-racemic;
where V is

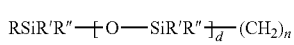

where n=3-15; d=1-5; and R' and R" are independently selected from C$_r$H$_{(2r+1)}$ and r=1-4, or a phenyl group; R is an alkyl group having from 1 to 10 carbon atoms, or one of W, W', or W",
where
W is

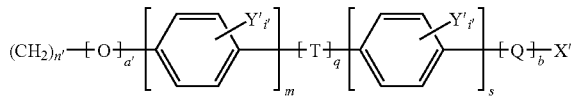

where n'=3-15; a'=0 or 1; m=1 or 2; s=1 or 2; q=0 or 1; b=0 or 1; i'=0-4; T=O, CH=N, N=CH, CF$_2$O, OCF$_2$, NHCO, CONH, CH$_2$, CH$_2$CH$_2$, C≡C, —CH=CH—, or CF$_2$CF$_2$; Y' is independently selected from halogen, NO$_2$, CN, CH$_3$, CF$_3$, OCF$_3$; Q=O, COO, or OCO; and X'=an alkyl; or substituted alkyl with at least one chiral centre, where individual chiral groups can be racemic or non-racemic, provided that the individual chiral groups are selected so that the liquid crystal formulation is non-racemic;
W' is

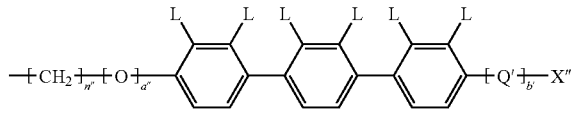

where n"=3-15; a"=0 or 1; b'=0 or 1; L is independently selected from H, halogen, NO$_2$, CN, CH$_3$, CF$_3$, OCF$_3$; Q'=O, COO, or OCO; and X"=an alkyl; or substituted alkyl with at least one chiral centre, where individual chiral groups can be racemic or non-racemic, provided that the individual chiral groups are selected so that the liquid crystal formulation is non-racemic; and
W" is one of

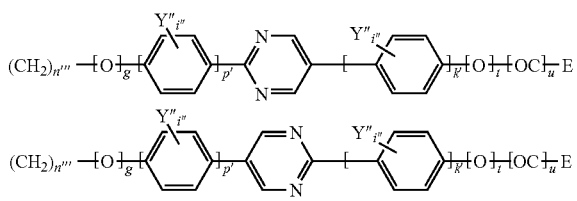

where n'''=3-15; g=0 or 1; p'=0, 1 or 2; k' is 0, 1 or 2; i"=0-4; t is 0 or 1; u=0 or 1; with the proviso that when t=0, u=0; Y" is independently selected from halogen, NO$_2$, CN, CH$_3$, CF$_3$, or OCF$_3$; E is an alkyl; or substituted alkyl with at least one chiral centre, where individual chiral groups can be racemic or non-racemic, provided that the individual chiral groups are selected so that the liquid crystal formulation is non-racemic;

wherein the terphenyl has a formula:

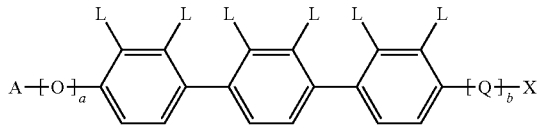

where a=0 or 1; b=0 or 1; L is independently selected from H, halogen, NO$_2$, CN, CH$_3$, CF$_3$, OCF$_3$; Q=O, COO, or OCO; X=an alkyl; or substituted alkyl with at least one chiral centre, where individual chiral groups can be racemic or non-racemic, provided that the individual chiral groups are selected so that the liquid crystal formulation is non-racemic;

where A is

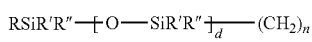

where n=3-15; d=1-5; R' and R" are independently selected from C$_r$H$_{(2r+1)}$ and r=1-4, or a phenyl group; R is an alkyl group having from 1 to 10 carbon atoms, or one of W, W' or W", where W is

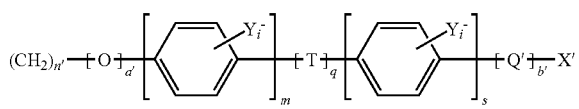

where n'=3-15; a'=0 or 1; m=1 or 2; s=1 or 2; q=0 or 1; b'=0 or 1; i=1-4; T=O, CH=N, N=CH, CF$_2$O, OCF$_2$, NHCO, CONH, CH$_2$, CH$_2$CH$_2$, C≡C, —CH=CH—, or CF$_2$CF$_2$; Y is independently selected from halogen, NO$_2$, CN, CH$_3$, CF$_3$, OCF$_3$; Q'=O, COO, or OCO; and X'=an alkyl; or substituted alkyl with at least one chiral centre, where individual chiral groups can be racemic or non-racemic, provided that the individual chiral groups are selected so that the liquid crystal formulation is non-racemic;

W' is

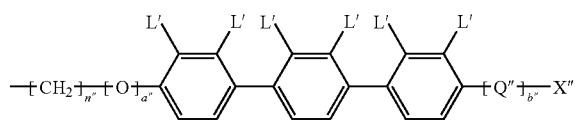

where n"=3-15; a"=0 or 1; b"=0 or 1; L'=is independently selected from H, halogen, NO$_2$, CN, CH$_3$, CF$_3$, OCF$_3$; where Q"=O, COO, or OCO; and X"=an alkyl; or substituted alkyl with at least one chiral centre, where individual chiral groups can be racemic or non-racemic, provided that the individual chiral groups are selected so that the liquid crystal formulation is non-racemic;

and

W" is one of

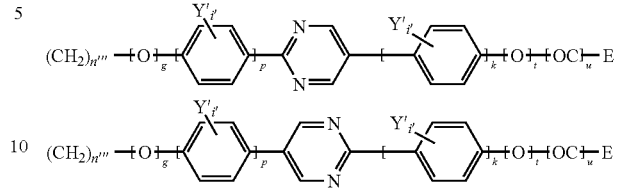

where n'''=3-15; g=0 or 1; p=0, 1 or 2; k is 0, 1 or 2; i'=0-4; t is 0 or 1; u=0 or 1; with the proviso that when t=0, u=0; Y' is independently selected from halogen, NO$_2$, CN, CH$_3$, CF$_3$, or OCF$_3$; E is an alkyl; or substituted alkyl with at least one chiral centre, where individual chiral groups can be racemic or non-racemic, provided that the individual chiral groups are selected so that the liquid crystal formulation is non-racemic;

wherein the biphenyls have a formula:

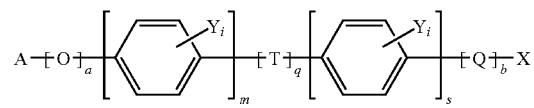

where a=0 or 1; m=1 or 2; s=1 or 2; q=0 or 1; b=0 or 1; i=0-4; T=O, CH=N, N=CH, CF$_2$O, OCF$_2$, NHCO, CONH, CH$_2$, CH$_2$CH$_2$, C≡C, —CH=CH— or CF$_2$CF$_2$; Y is independently selected from halogen, NO$_2$, CN, CH$_3$, CF$_3$, OCF$_3$; Q=O, COO, or OCO; and X=an alkyl; or substituted alkyl with at least one chiral centre, where individual chiral groups can be racemic or non-racemic, provided that the individual chiral groups are selected so that the liquid crystal formulation is non-racemic;

A is

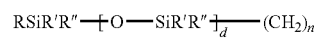

where n=3-15; d=1-5; R', and R" are independently selected from C$_r$H$_{(2r+1)}$ and r=1-4, or a phenyl group; R is an alkyl group having from 1 to 10 carbon atoms or the group W, where W is

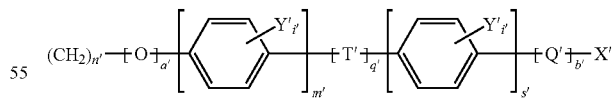

where n'=3-15; a'=0 or 1; m'=1 or 2; s'=1 or 2; q'=0 or 1; b'=0 or 1; i'=0-4; where T'=O, CH=N, N=CH, CF$_2$O, OCF$_2$, NHCO, CONH, CH$_2$, CH$_2$CH$_2$, C≡C, —CH=CH—, or CF$_2$CF$_2$; Y' is independently selected from halogen, NO$_2$, CN, CH$_3$, CF$_3$, OCF$_3$; Q'=O, COO, or OCO; and X'=an alkyl; or substituted alkyl with at least one chiral centre, where individual chiral groups can be racemic or non-racemic, provided that the individual chiral groups are selected so that the liquid crystal formulation is non-racemic;

and
wherein the additional material has a formula

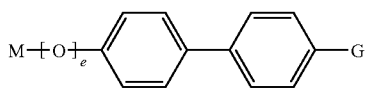

where e=0 or 1; G is H, halogen, an epoxide, $NO_2$, CN, $CH_3$, $CF_3$, or $OCF_3$; M is an alkyl; substituted alkyl with at least one chiral centre, where individual chiral groups can be racemic or non-racemic, provided that the individual chiral groups are selected so that the liquid crystal formulation is non-racemic; or the group

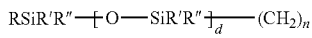

where n=3-15; d=1-5; and R' and R" are independently selected from $C_rH_{(2r+1)}$ and r=1-4, or a phenyl group; R is an alkyl group having from 1 to 10 carbon atoms, or Z, where Z is

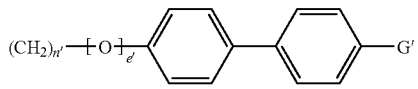

where n'=3-15; e'=0 or 1; G' is H, halogen, an epoxide, $NO_2$, CN, $CH_3$, $CF_3$, or $OCF_3$.

18. The method of claim 17 further comprising adding a second additional material wherein the second additional material has a formula of one of:

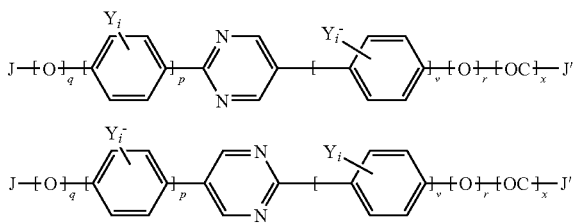

where r=0 or 1; p=0, 1 or 2; v=0, 1, or 2; x=0 or 1; q=0 or 1; i=0-4; with the proviso that when r=0, x=0; Y is independently selected from halogen, $NO_2$, CN, $CH_3$, $CF_3$, or $OCF_3$; J and J' are independently selected from an alkyl; or substituted alkyl with at least one chiral centre, where individual chiral groups can be racemic or non-racemic, provided that the individual chiral groups are selected to ensure that the liquid crystal formulation is non-racemic.

19. The method of claim 17 further comprising adding a second oligosiloxane-modified nano-phase segregating liquid crystalline material, the second oligosiloxane-modified nano-phase segregating liquid crystalline material being, a terphenyl, a phenyl pyrimidine, a biphenyl pyrimidine, or biphenyls;

wherein the phenyl pyrimidine or biphenyl pyrimidine has a formula:

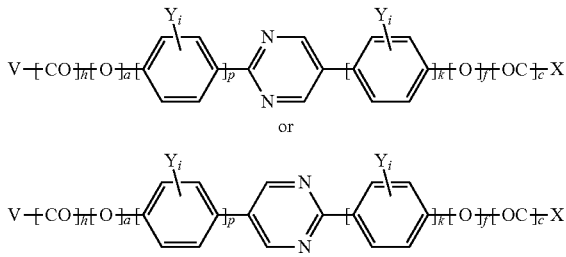

where:
a=0 or 1; p=0, 1 or 2; k=0, 1, or 2; f=0 or 1; h=0 or 1; i=0-4; c=0 or 1; with the proviso that if f=0, c=0; with the proviso that if a=0, h=0; Y is independently selected from halogen $NO_2$, CN, $CH_3$, $CF_3$, or $OCF_3$;

where X=an alkyl; or a substituted alkyl with at least one chiral centre, where individual chiral groups can be racemic or non-racemic, provided that the individual chiral groups are selected so that the liquid crystal formulation is non-racemic;

where V is

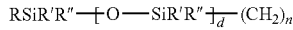

where n=3-15 ; d=1-5 ; and R' and R" are independently selected from $C_rH_{(2r+1)}$ and r=1-4, or a phenyl group; R is an alkyl group having from 1 to 10 carbon atoms, or one of W, W', or W", where
W is

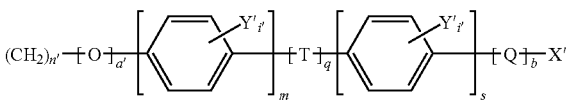

where n'=3-15; a'=0 or 1; m=1 or 2; s=1 or 2; q=0 or 1; b=0 or 1; i'=0-4; T=O, CH=N, N=CH, $CF_2O$, $OCF_2$, NHCO, CONH, $CH_2$, $CH_2CH_2$, C≡C, —CH=CH—, or $CF_2CF_2$; Y' is independently selected from halogen, $NO_2$, CN, $CH_3$, $CF_3$,$OCF_3$; Q=O, COO, or OCO; and X'=an alkyl; or substituted alkyl with at least one chiral centre, where individual chiral groups can be racemic or non-racemic, provided that the individual chiral groups are selected so that the liquid crystal formulation is non-racemic;

W' is

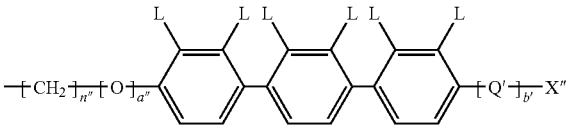

where n"=3-15; a"=0 or 1; b'=0 or 1; L is independently selected from H, halogen, $NO_2$, CN, $CH_3$, $CF_3$, $OCF_3$; Q'=O, COO, or OCO; and X"=an alkl; or substituted alkyl with at least one chiral centre, where individual chiral groups can be racemic or non-racemic, provided that the individual chiral groups are selected so that the liquid crystal formulation is non-racemic; and
W" is one of

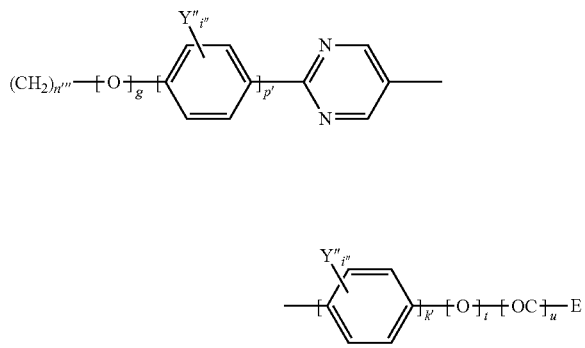

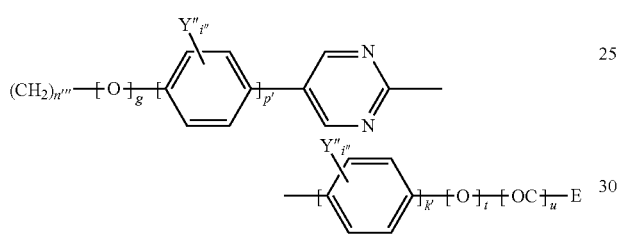

where n'''=3-15; g=0 or 1; p'=0, 1 or 2; k' is 0, 1 or 2; i"=0-4; t is 0 or 1; u=0 or 1; with the proviso that when t=0, u=0; Y" is independently selected from halogen, NO$_2$, CN, CH$_3$, CF$_3$, or OCF$_3$; E is an alkyl; or substituted alkyl with at least one chiral centre, where individual chiral groups can be racemic or non-racemic, provided that the individual chiral groups are selected so that the liquid crystal formulation is non-racemic;
wherein the terphenyl has a formula:

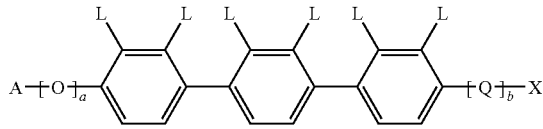

where a=0 or 1; b=0 or 1; L is independently selected from H, halogen, NO$_2$CN, CH$_3$, CF$_3$, OCF$_3$; Q=O, COO, or OCO; X=an alkyl; or substituted alkyl with at least one chiral centre, where individual chiral groups can be racemic or non-racemic, provided that the individual chiral groups are selected so that the liquid crystal formulation is non-racemic;
where A is

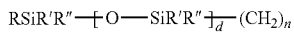

where n=3-15; d=1-5; R' and R" are independently selected from C$_r$H$_{(2r+1)}$ and r=1-4, or a phenyl group; R is an alkyl group having from 1 to 10 carbon atoms, or one of W, W' or W", where W is

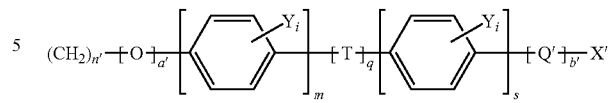

where n'=3-15; a'=0 or 1; m=1 or 2; s=1 or 2; q=0 or 1; b'=0 or 1; i=1-4; T=O, CH=N, N=CH, CF$_2$O, OCF$_2$, NHCO, CONH, CH$_2$, CH$_2$CH$_2$, C≡C, —CH=CH—, or CF$_2$CF$_2$; Y is independently selected from halogen, NO$_2$, CN, CH$_3$, CF$_3$, OCF$_3$; Q'=O, COO, or OCO; and X'=an alkyl; or substituted alkyl with at least one chiral centre, where individual chiral groups can be racemic or non-racemic, provided that the individual chiral groups are selected so that the liquid crystal formulation is non-racemic;
W' is

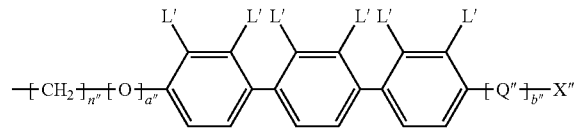

where n"=3-15; a"=0 or 1; b"=0 or 1; L'=is independently selected from H, halogen, NO$_2$, CN, CH$_3$, CF$_3$, OCF$_3$; where Q"=O, COO, or OCO; and X"=an alkyl; or substituted alkyl with at least one chiral centre, where individual chiral groups can be racemic or non-racemic, provided that the individual chiral groups are selected so that the liquid crystal formulation is non-racemic; and
W" is one of

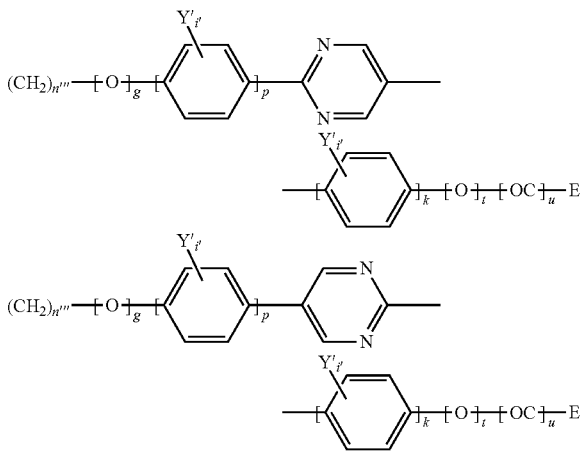

where n'''=3-15; g=0 or 1; p=0, 1 or 2; k is 0, 1 or 2; i'=0-4; t is 0 or 1; u=0 or 1;
with the proviso that when t=0, u=0; Y' is independently selected from halogen, NO$_2$, CN, CH$_3$, CF$_3$, or OCF$_3$; E is an alkyl; or substituted alkyl with at least one chiral centre, where individual chiral groups can be racemic or non-racemic, provided that the individual chiral groups are selected so that the liquid crystal formulation is non-racemic;

wherein the biphenyls have a formula:

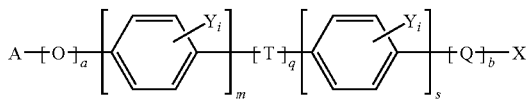

where a=0 or 1; m=1 or 2; s=1 or 2; q=0 or 1; b=0 or 1; i=0-4; T=O, CH=N, N=CH, $CF_2O$, $OCF_2$, NHCO, CONH, $CH_2$, $CH_2CH_2$, C≡C, —CH=CH— or $CF_2CF_2$; Y is independently selected from halogen, $NO_2$, CN, $CH_3$, $CF_3$, $OCF_3$; Q=O, COO, or OCO; and X=an alkyl; or substituted alkyl with at least one chiral centre, where individual chiral groups can be racemic or non-racemic, provided that the individual chiral groups are selected so that the liquid crystal formulation is non-racemic;
A is

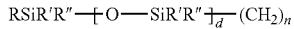

where n=3-15; d=1-5; R', and R" are independently selected from $C_rH_{(2r+1)}$ and r=1-4, or a phenyl group; R is an alkyl group having from 1 to 10 carbon atoms or the group W,
where W is

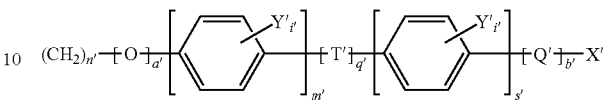

where n'=3-15; a'=0 or 1; m'=1 or 2; s'=1 or 2; q'=0 or 1; b'=0 or 1; i'=0-4; where T'=O, CH=N, N=CH, $CF_2O$, $OCF_2$, NHCO, CONH, $CH_2$, $CH_2CH_2$, C≡C, —CH=CH—, or $CF_2CF_2$; Y' is independently selected from halogen, $NO_2$, CN, $CH_3$, $CF_3$, $OCF_3$; Q'=O, COO, or OCO; and X'=an alkyl; or substituted alkyl with at least one chiral centre, where individual chiral groups can be racemic or non-racemic, provided that the individual chiral groups are selected so that the liquid crystal formulation is non-racemic.

* * * * *